(12) United States Patent
McCrosky et al.

(10) Patent No.: US 6,741,552 B1
(45) Date of Patent: May 25, 2004

(54) FAULT-TOLERANT, HIGHLY-SCALABLE CELL SWITCHING ARCHITECTURE

(75) Inventors: Carl McCrosky, Saskatoon (CA); Jeff S. Roe, Saskatoon (CA); Ian G. Barrett, Saskatoon (CA); Ken Sailor, Saskatoon (CA)

(73) Assignee: PMC Sierra Inertnational, Inc., Bridgetown (BB)

( * ) Notice: Subject to any disclaimer, the term of this patent is extended or adjusted under 35 U.S.C. 154(b) by 0 days.

(21) Appl. No.: 09/022,679

(22) Filed: Feb. 12, 1998

(51) Int. Cl.[7] ............................................. G01R 31/08
(52) U.S. Cl. ..................... 370/218; 370/360; 370/387; 370/388; 370/395.71; 709/243; 712/12
(58) Field of Search ............................. 370/218, 236.2, 370/242, 244, 255, 312, 351, 352, 353, 356, 359, 360, 387, 388, 389, 395.42, 395.51, 409, 412–418, 428, 429, 537, 902, 395.71; 709/238–345; 712/12

(56) References Cited

U.S. PATENT DOCUMENTS

| | | | |
|---|---|---|---|
| 4,598,400 A | | 7/1986 | Hillis .......................... 370/351 |
| 4,868,818 A | * | 9/1989 | Madan et al. .................... 714/4 |
| 5,218,676 A | * | 6/1993 | Ben-Ayed et al. ........... 709/240 |
| 5,255,368 A | | 10/1993 | Barry .......................... 395/200 |
| 5,367,692 A | * | 11/1994 | Edelman ...................... 712/22 |

OTHER PUBLICATIONS

McCrosky et al, Intergration of Telecommunications Switching on SCS Hypercube Packet Switches, IEEE, pp. 150–153, 1993.*

Pao et al, Design of ATM Switch Using Hypercube with Distributed Shared Input Buffers and Dedicated Output Buffers, IEEE, pp. 92–99, 1995.*

Matsunaga, Sorting–Based Routing Algorithms of a Photonic ATM Cell Switch: HiPower, IEEE, pp. 1356–1363, 1993.*

Chen, Algorithm–Based Fault–Tolerant Strategies in Faulty Hypercube and Star Graph Multicomputer, Dissertation, pp. 1–106, Jan. 16, 1996.*

* cited by examiner

*Primary Examiner*—Frank Duong
(74) *Attorney, Agent, or Firm*—Burns, Doane, Swecker & Mathis L.L.P.

(57) ABSTRACT

Generally speaking, the cell switching architecture of the present invention offers a powerful, simple, and in many ways elegant solution to the problem of providing cost-effective, high-bandwidth, fault-tolerant cell switching. The architecture is based on a network of switching elements connected in a hypercube topology to form a switch fabric. The generalized hypercube is D dimensional, where $D \geq 3$ when all radices in the radix set are 2 and $D \geq 2$ when at least one of the radices is greater than 2. A fully-populated switch is fully symmetric: each switching element has the same number and kind of connections to both its neighbors and to the outside world as every other switching element. In an exemplary embodiment, each switching element is connected to one data source and one data sink, e.g., a Utopia bus or other broadband connection. In the same exemplary embodiment, links between switching elements are bidirectional and synchronous, operating in accordance with a Cell Exchange Cycle (CEC). Buffer space for a limited number N of cells is provided within each switching element. Multipath routing allows a switching element to forward a cell along any of multiple paths. Retrograde and lateral motion, i.e., motion other than in a forward direction toward the cell's destination, is also allowed to relieve temporary local congestion.

57 Claims, 18 Drawing Sheets

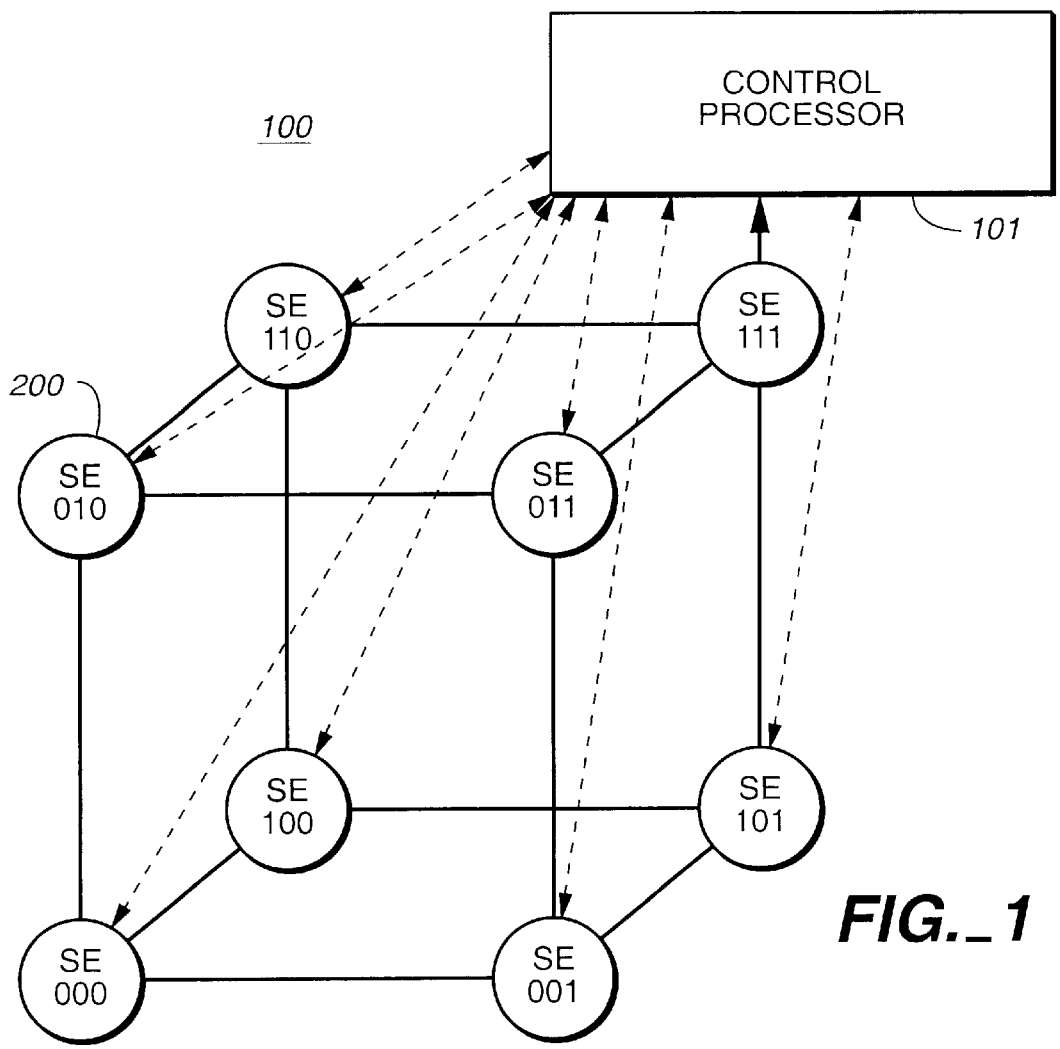
FIG._1

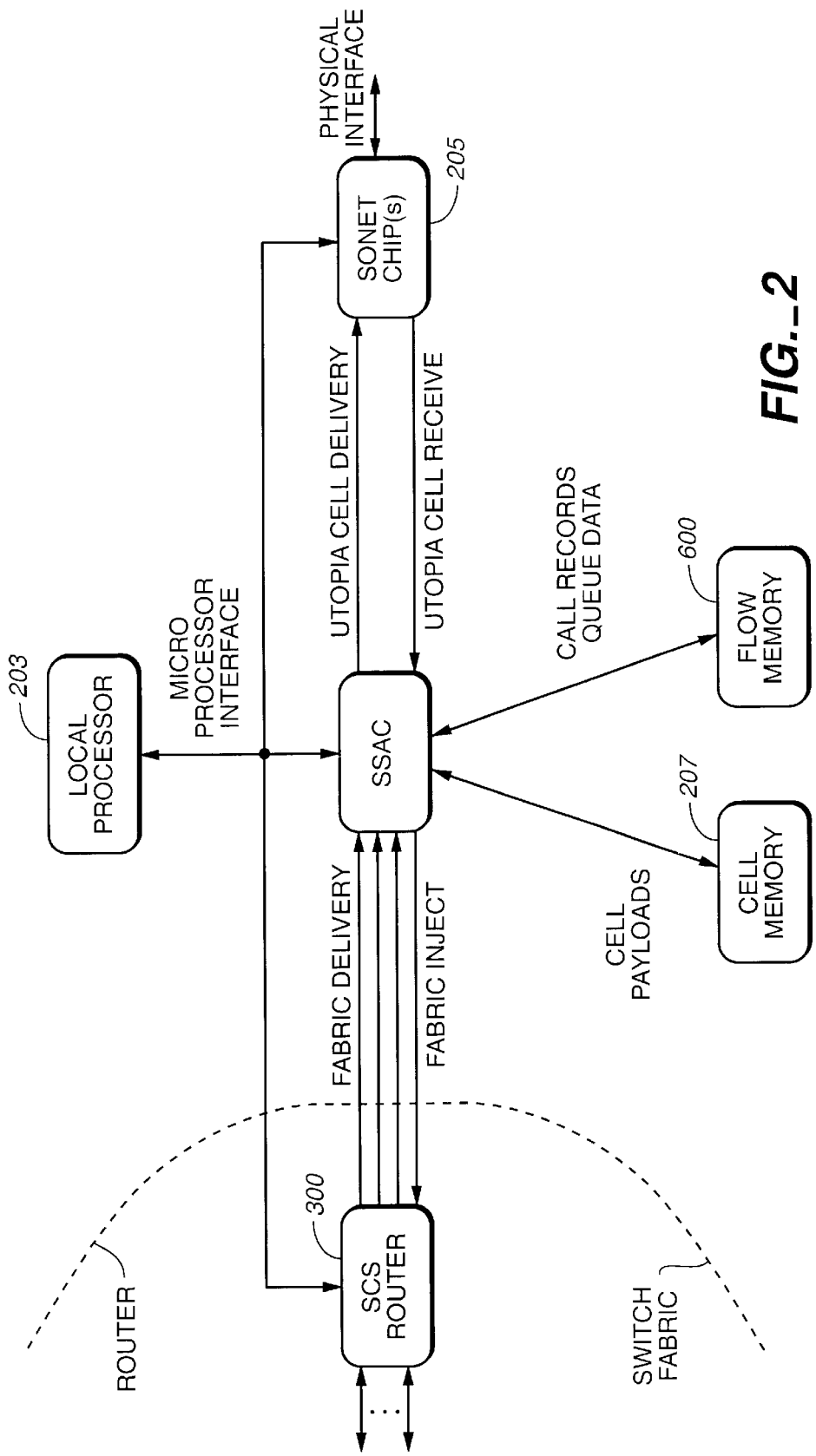
FIG._2

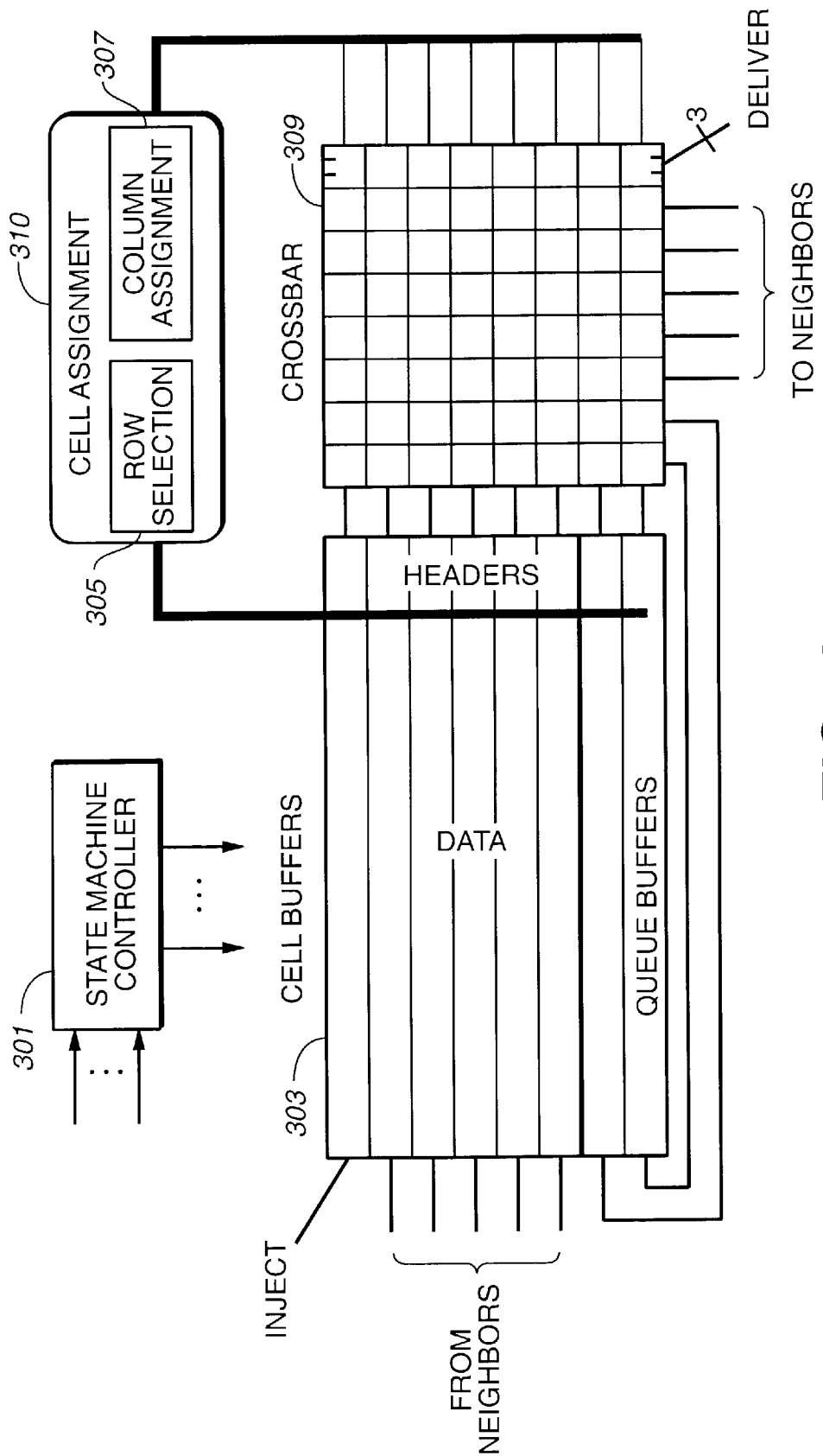
FIG._3

| NIBBLE | BIT 0 | BIT 1 | BIT 2 | BIT 3 |
|---|---|---|---|---|
| 0 | V1 | P2 | P1 | P0 |
| 1 | V0 | PTI2 | PTI1 | PTI0 |
| 2 | R0 | R1 | R2 | R3 |
| 3 | R4 | R5 | R6 | R7 |
| 4 | L3 | L2 | L1 | L0 |
| 5 | SB | CLP | S5 | S4 |
| 6 | S3 | S2 | S1 | S0 |
| 7 |  |  | VC13 | VC12 |
| 8 | VC11 | VC10 | VC9 | VC8 |
| 9 | VC7 | VC6 | VC5 | VC4 |
| 10 | VC3 | VC2 | VC1 | VC0 |
| 11 | C0,7 | C0,6 | C0,5 | C0,4 |
| 12 | C0,3 | C0,2 | C0,1 | C0,0 |
| 13 | C1,7 | C1,6 | C1,5 | C1,4 |
| 14 | C1,3 | C1,2 | C1,1 | C1,0 |
| 105 | C47,7 | C47,6 | C47,5 | C47,4 |
| 106 | C47,3 | C47,2 | C47,1 | C47,0 |

*FIG._4*

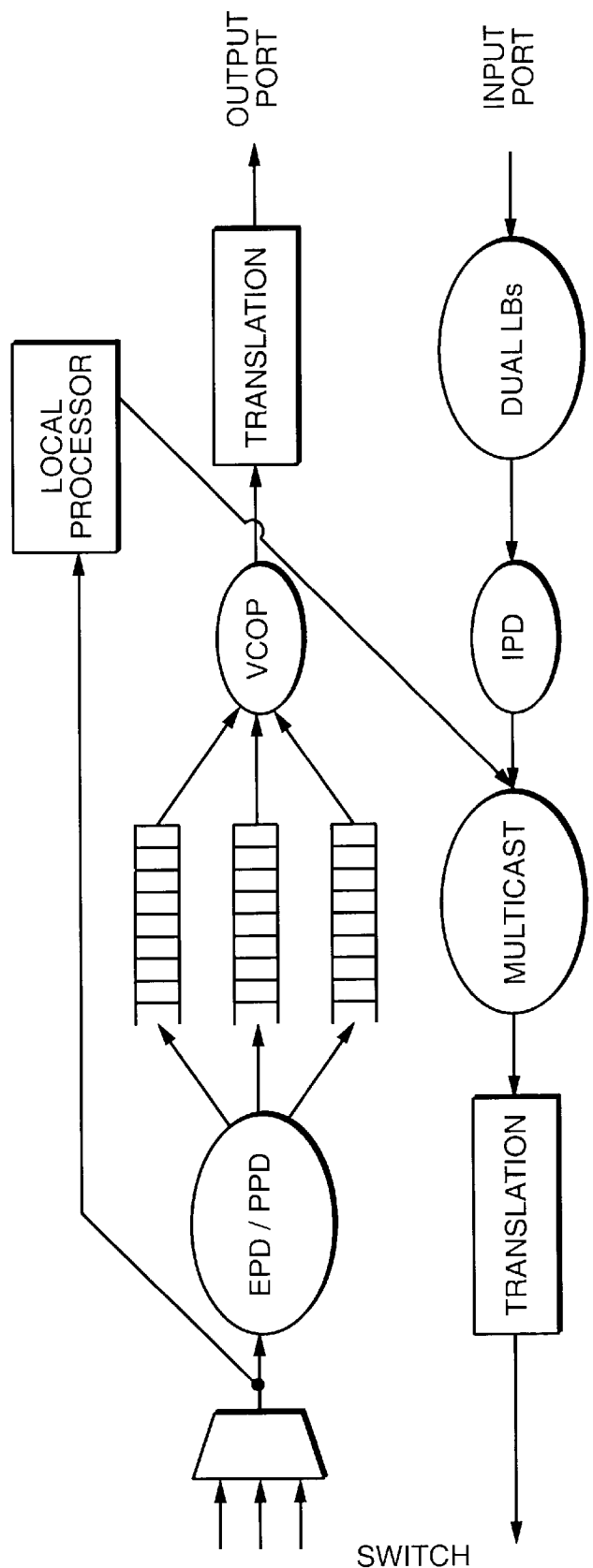
FIG._5

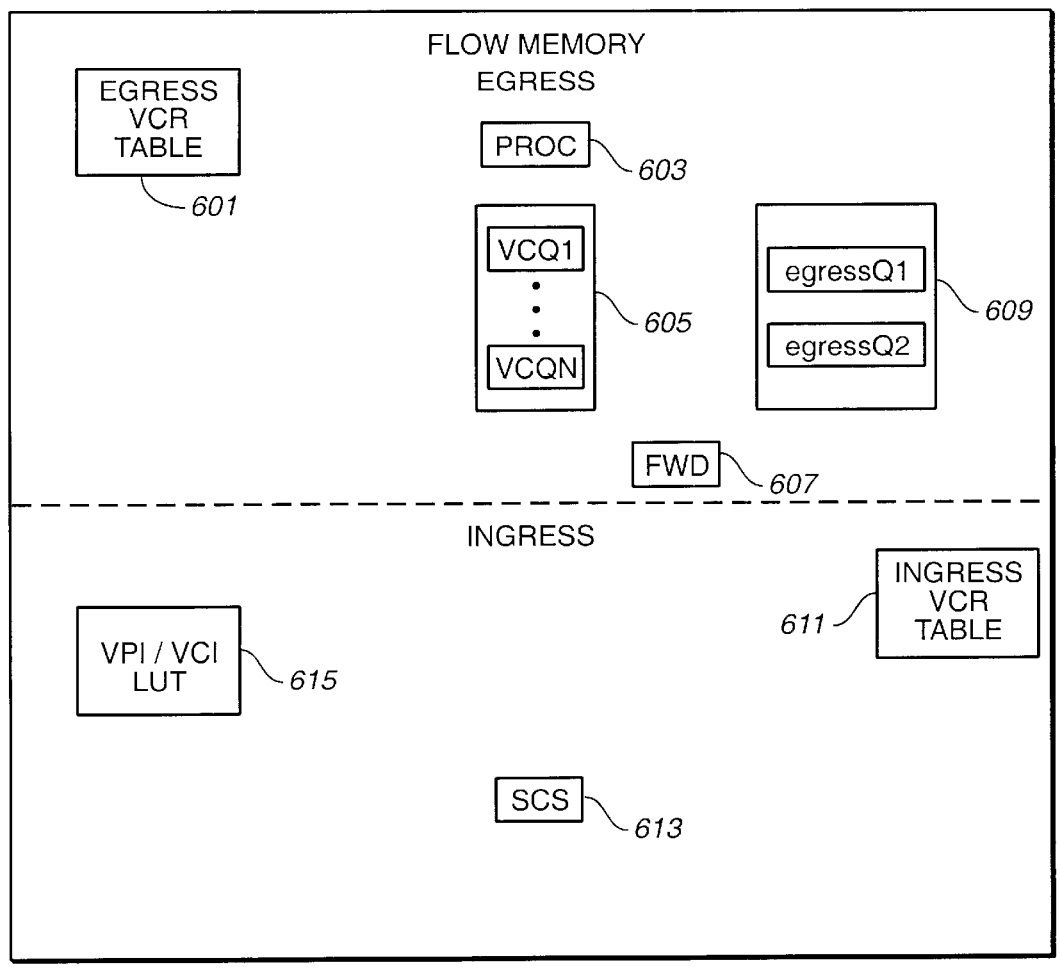
FIG._6
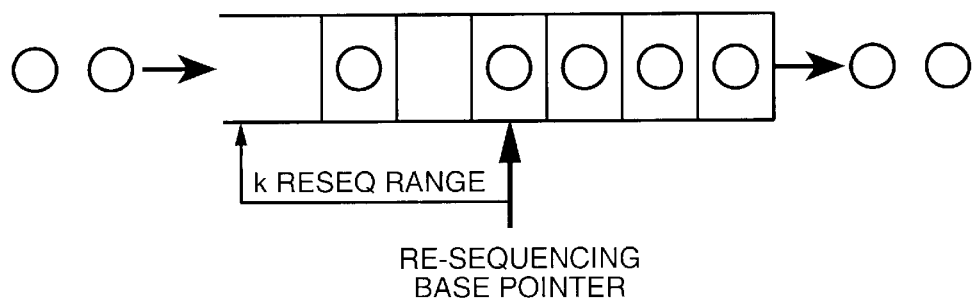
FIG._9

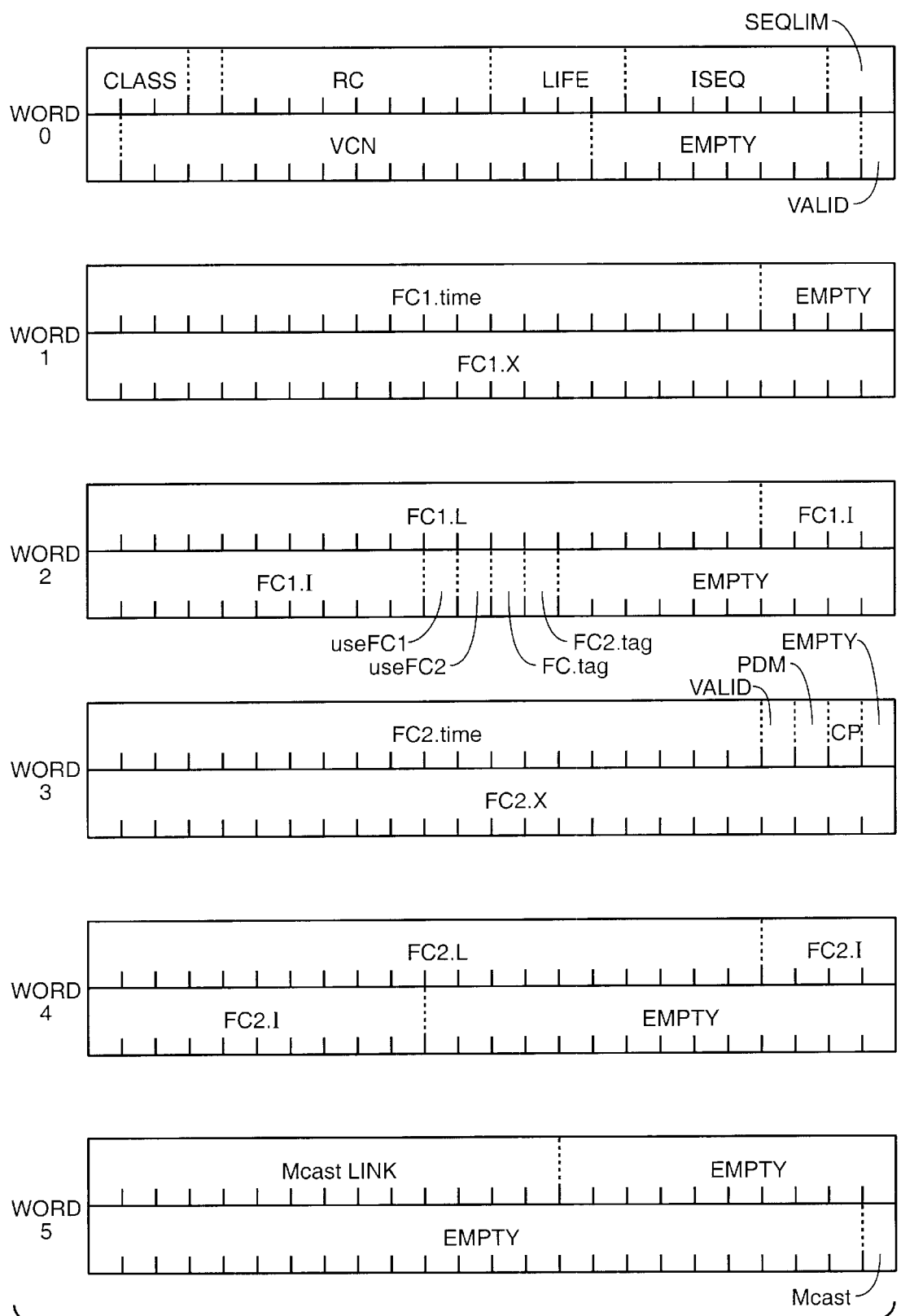
FIG._7

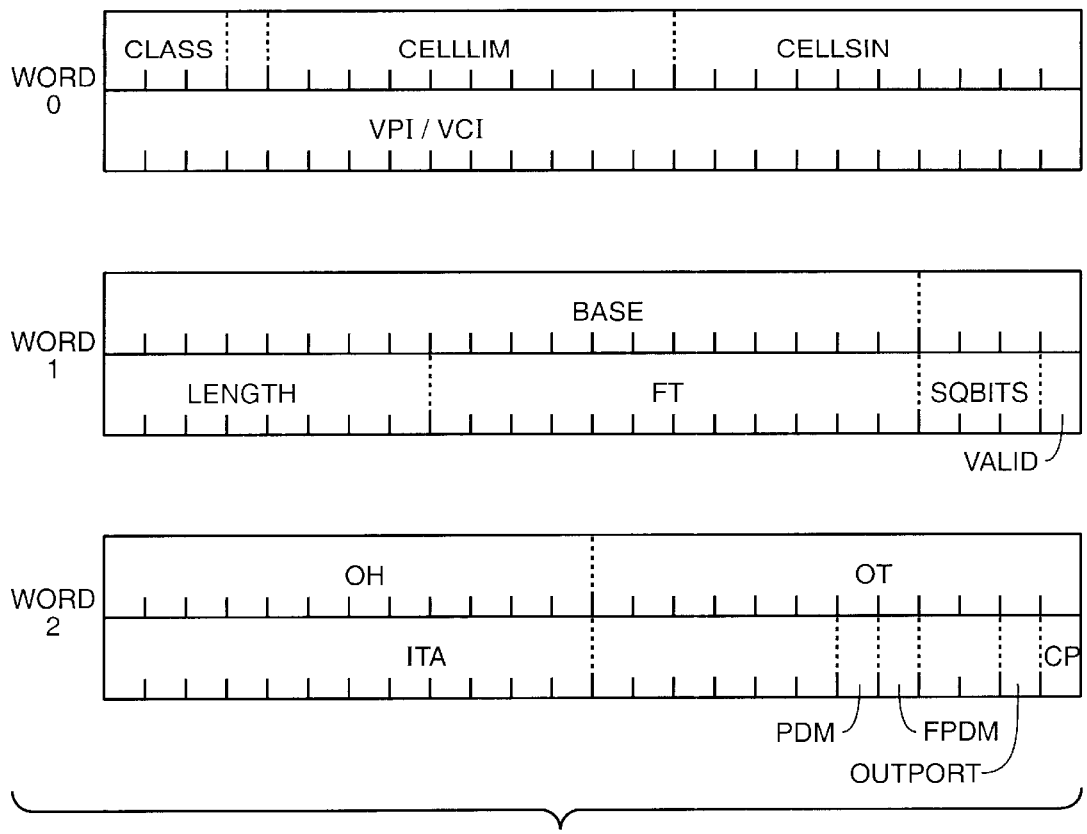
FIG._8
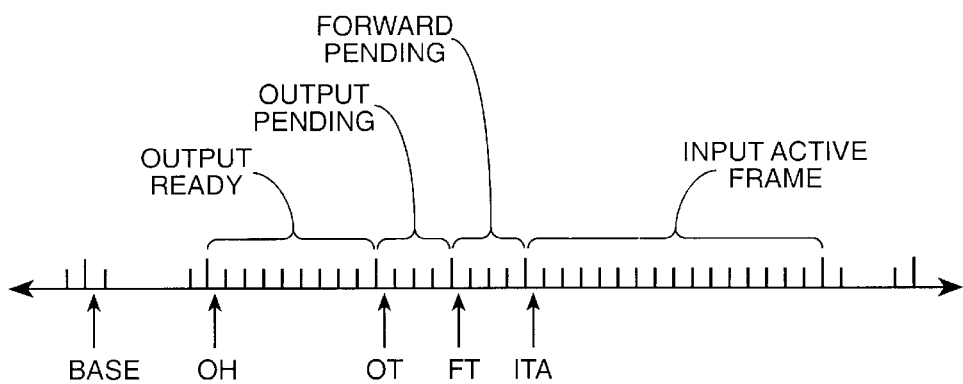
FIG._10

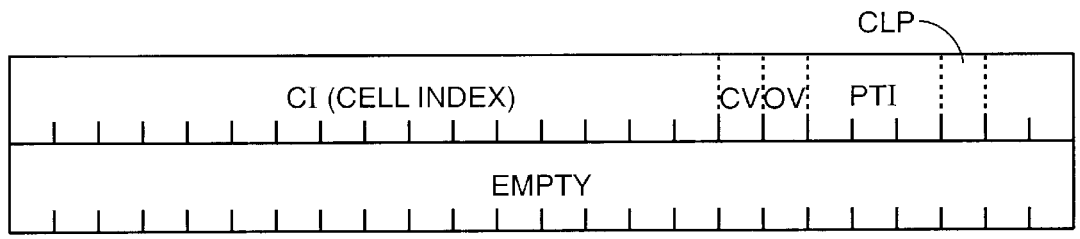
FIG._11
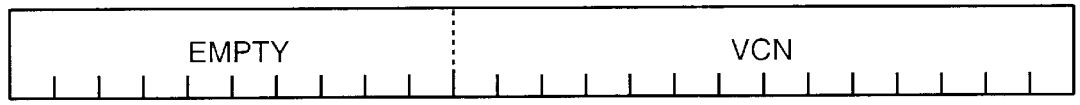
FIG._12
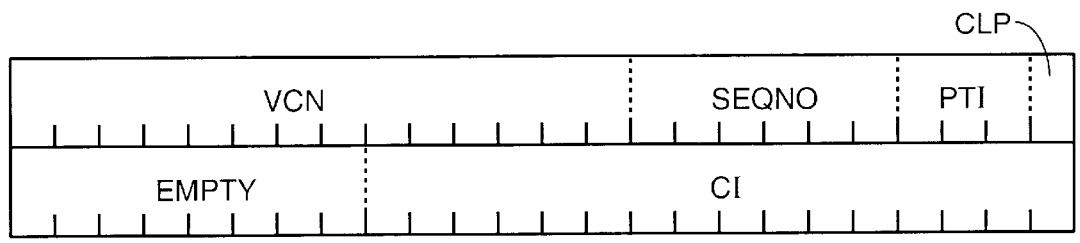
FIG._13
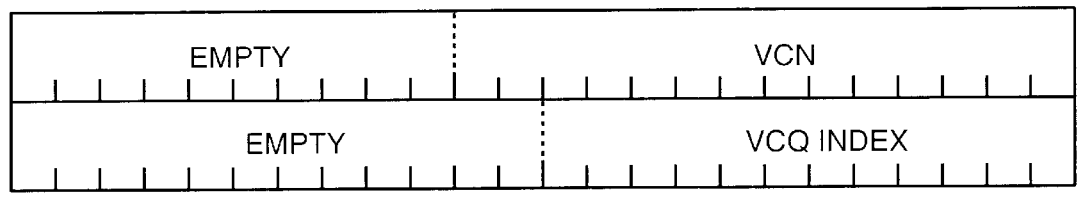
FIG._14
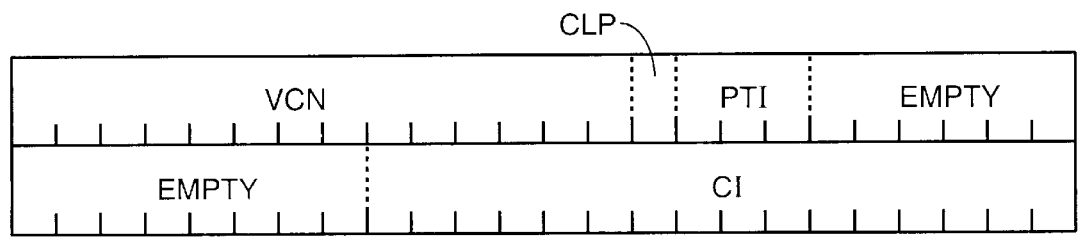
FIG._15

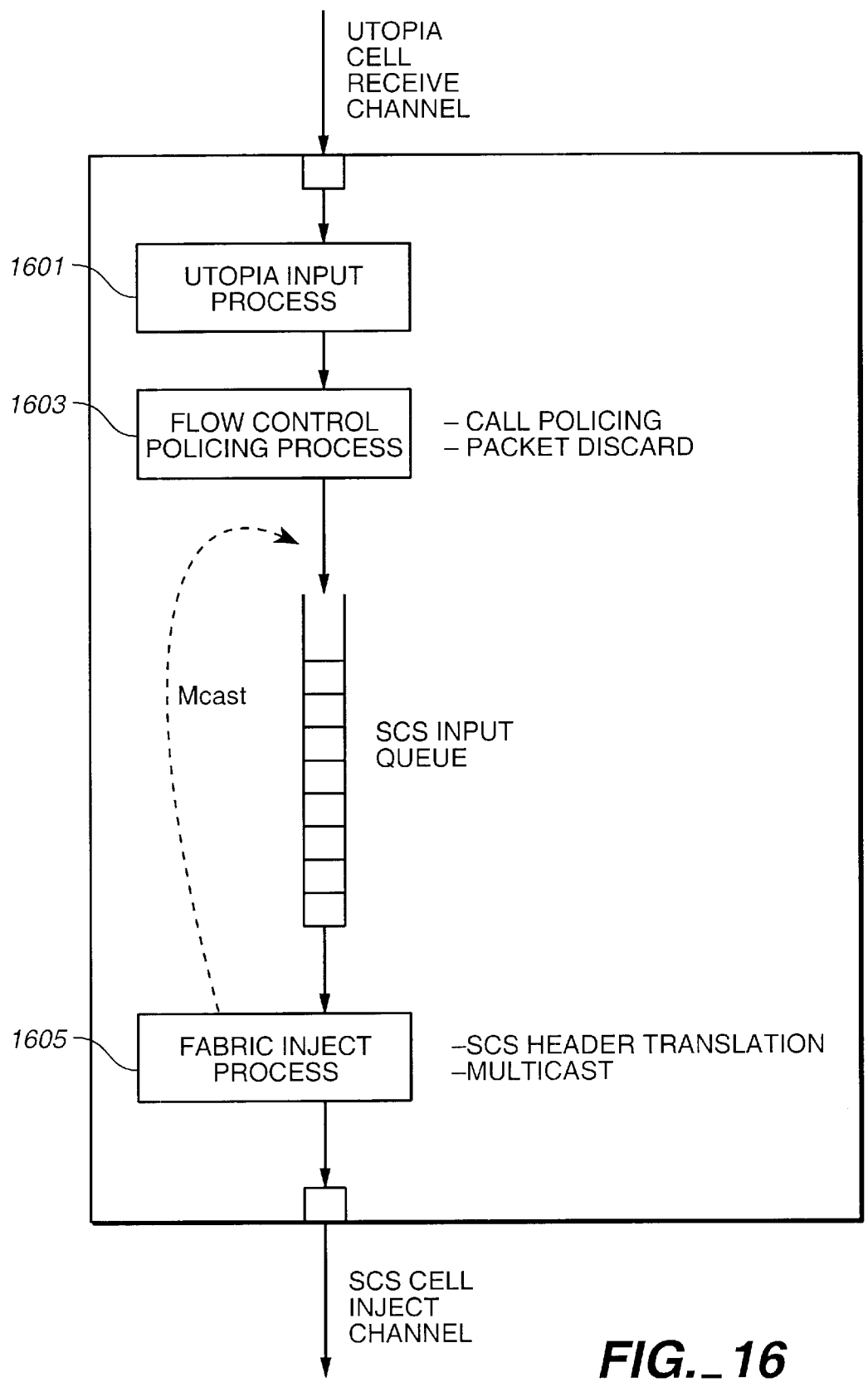
FIG._16

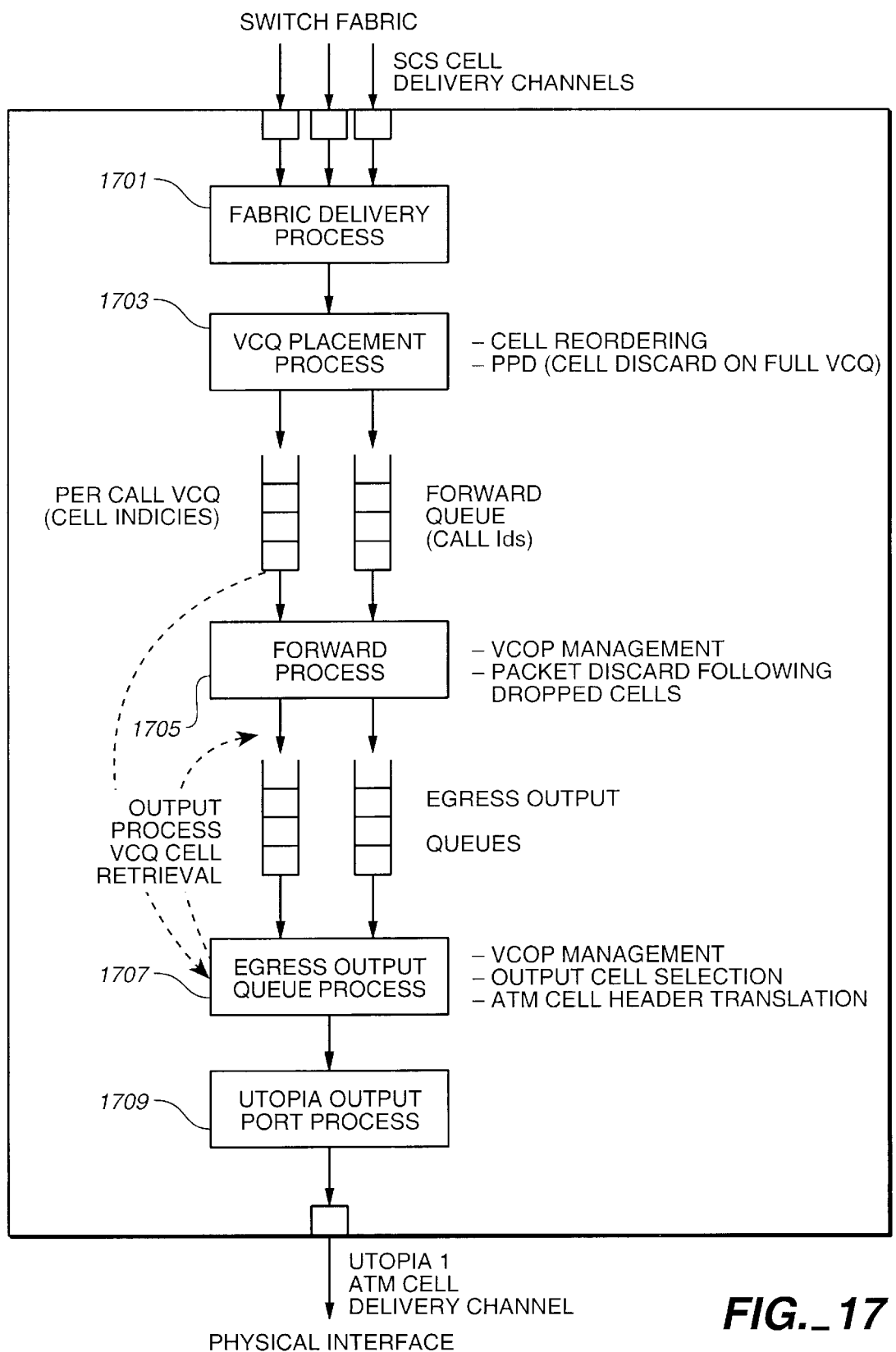
FIG._17

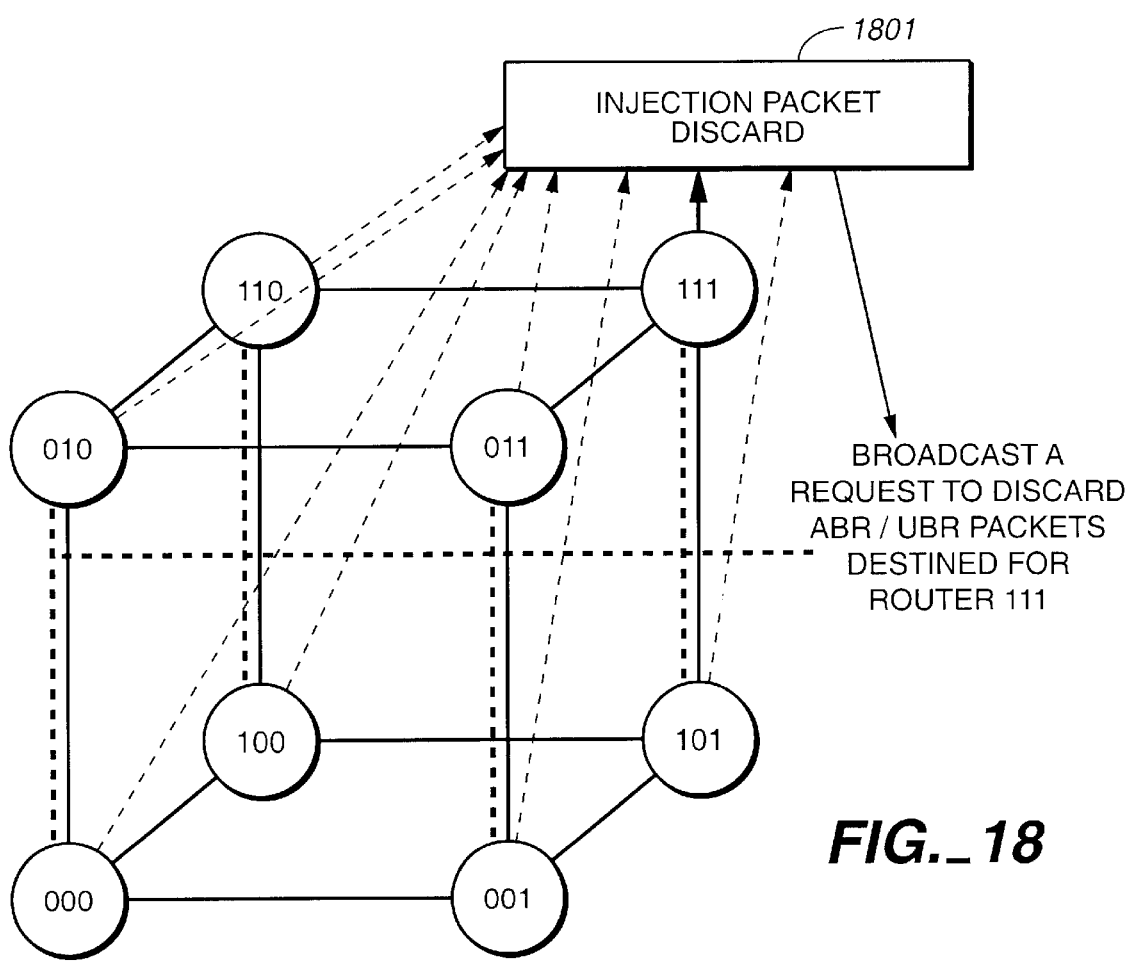
FIG._18

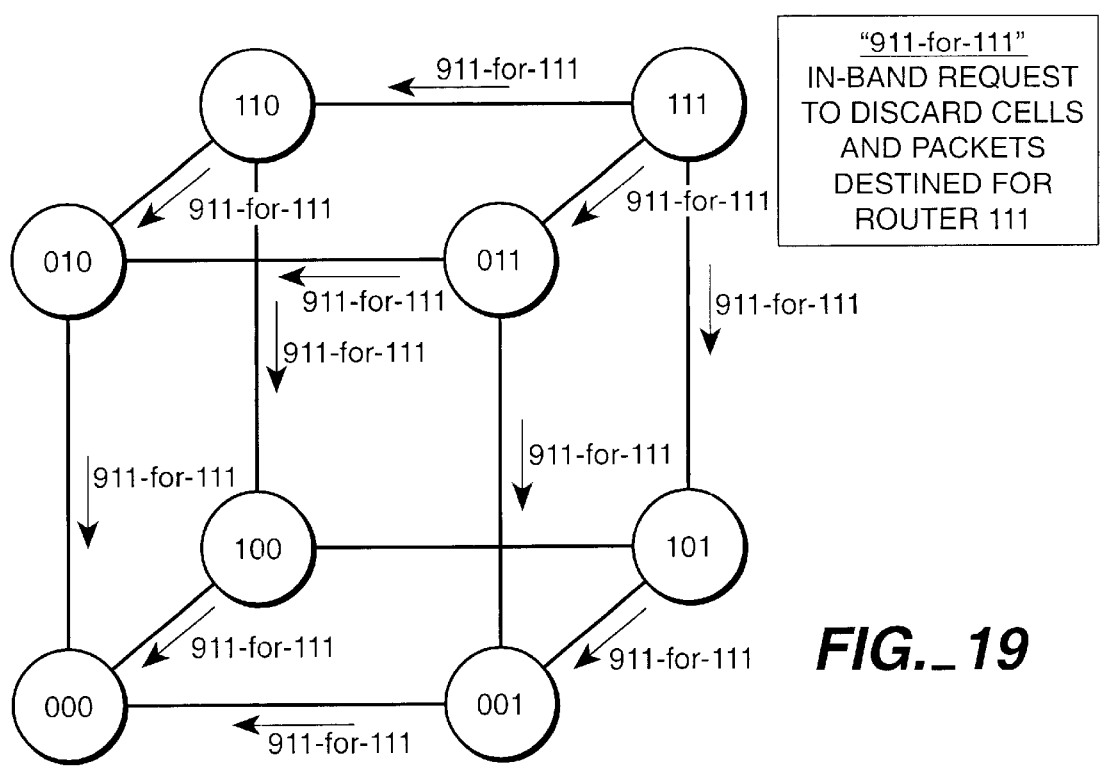
*FIG._19*
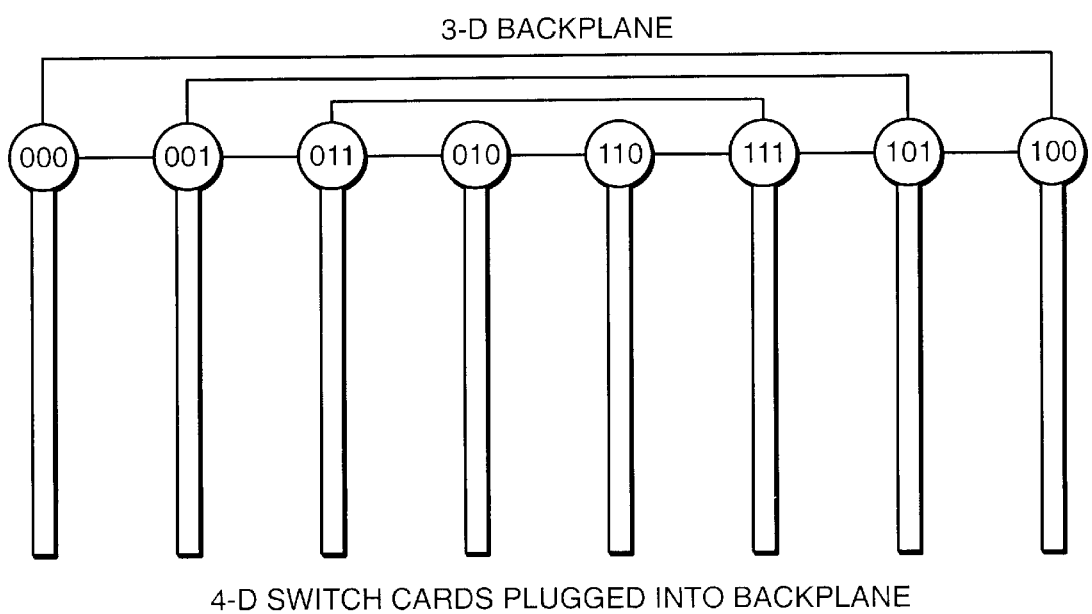
*FIG._21*

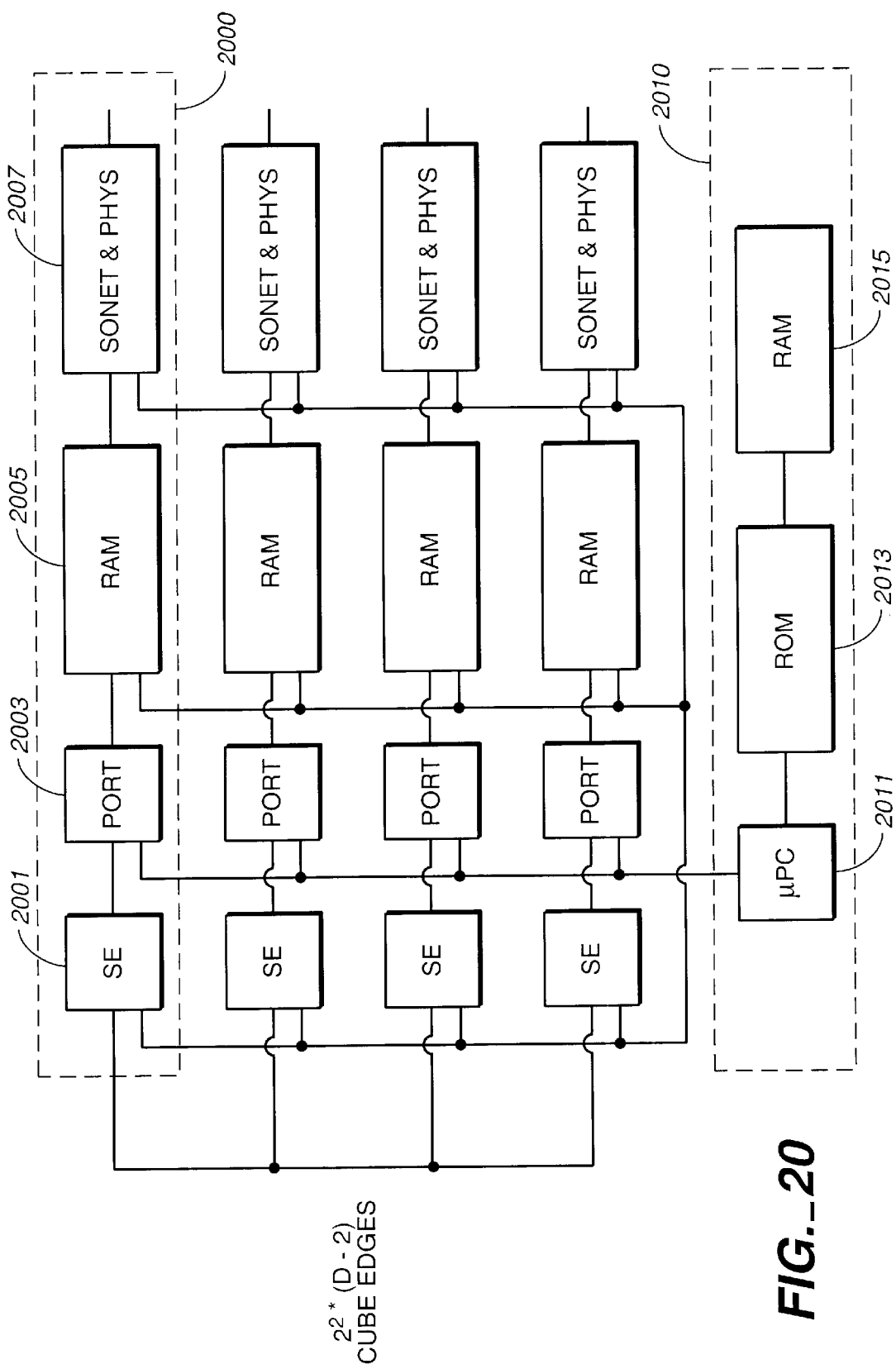
FIG._20

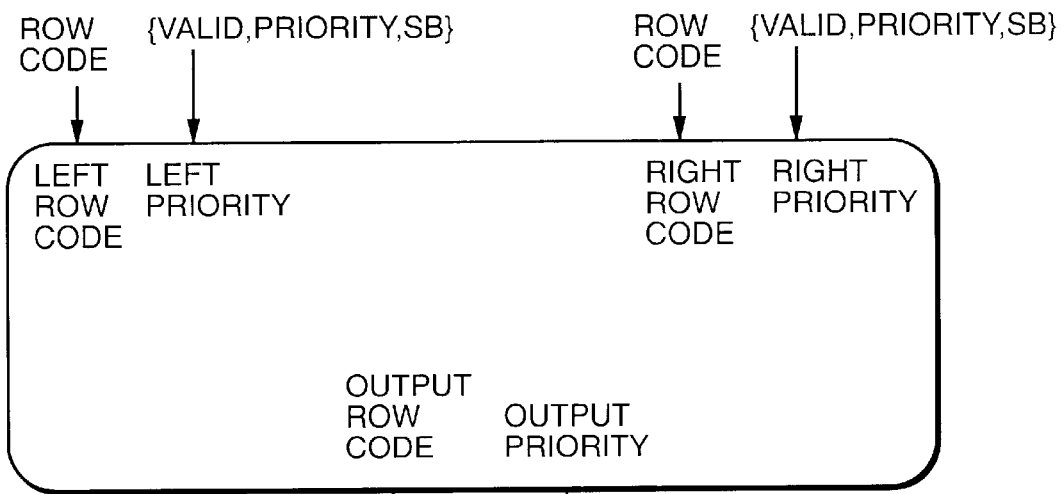
FIG._22
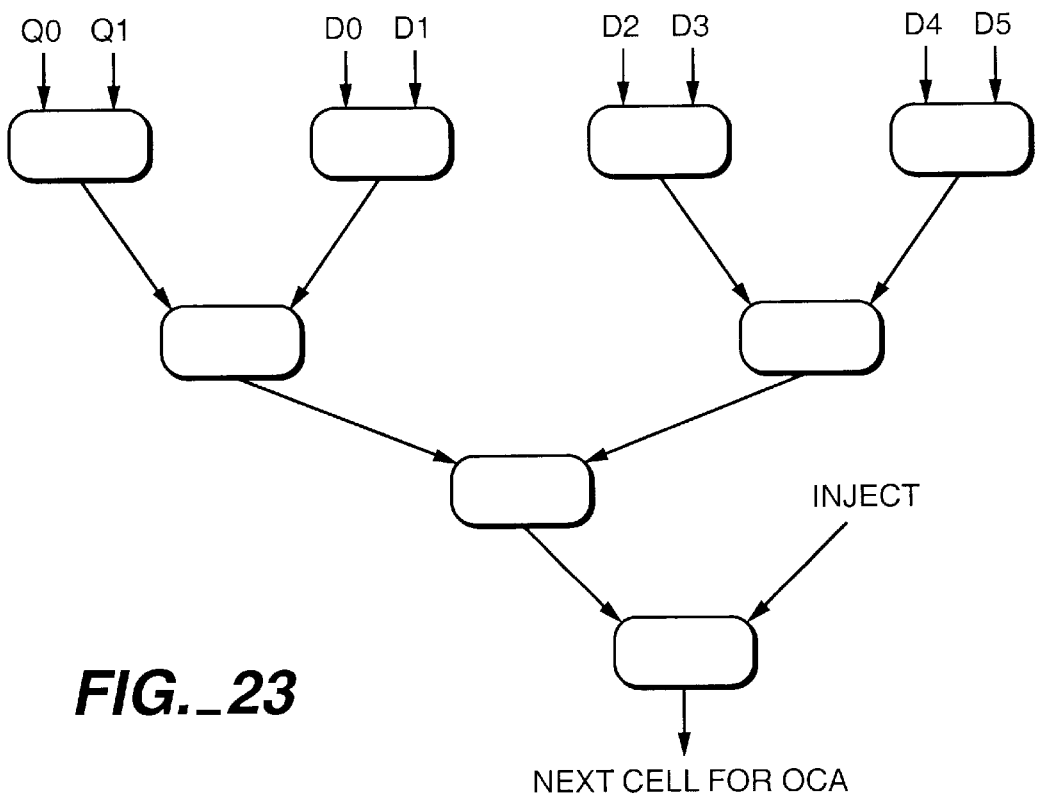
FIG._23

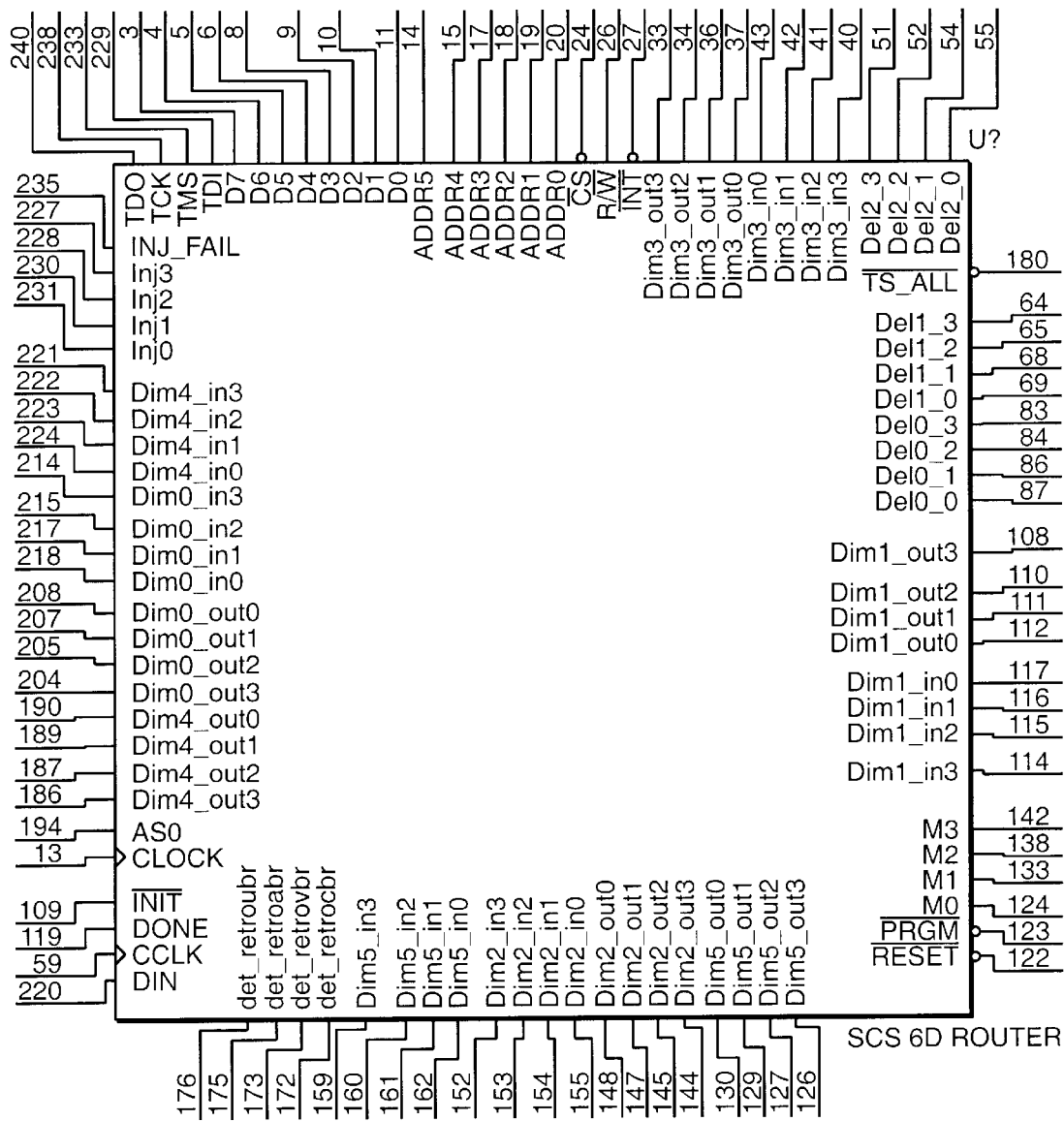
FIG._24

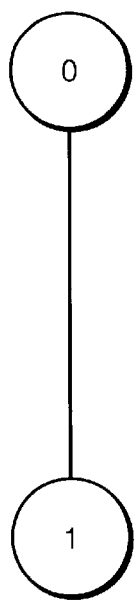
FIG._25A
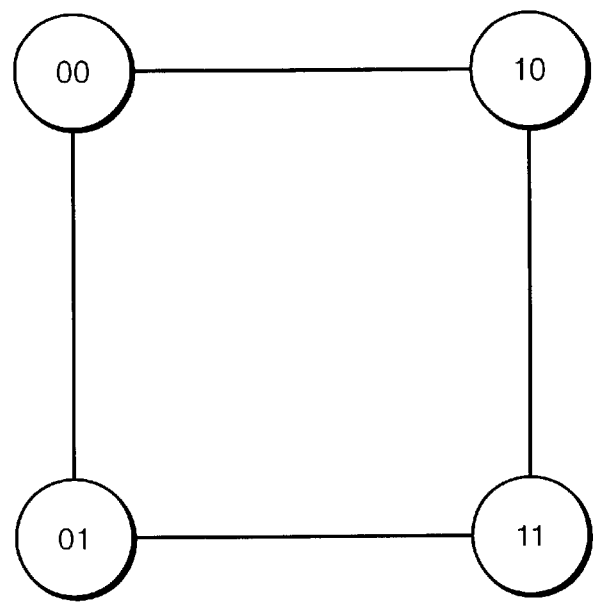
FIG._25B
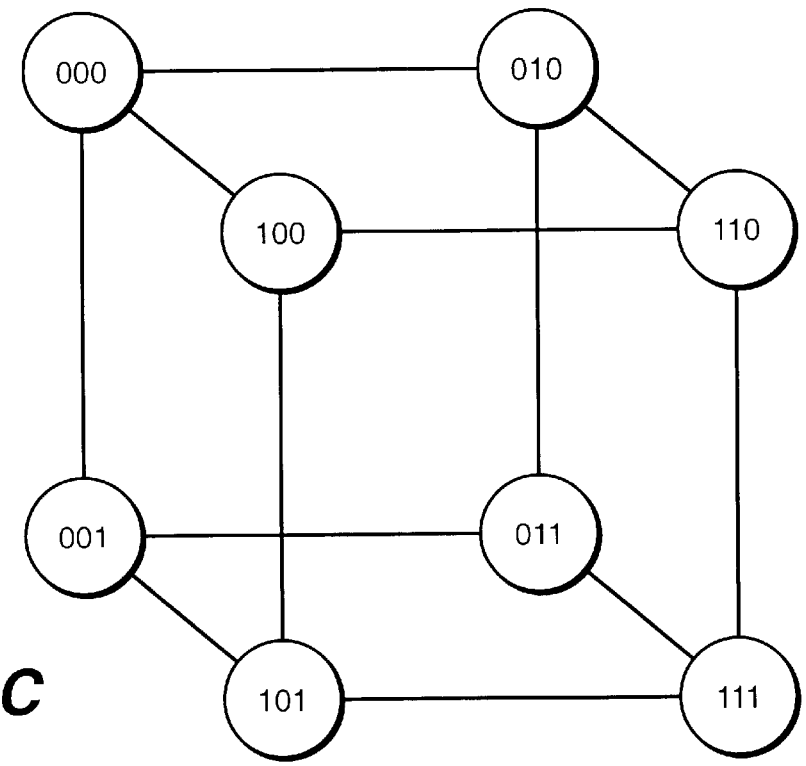
FIG._25C

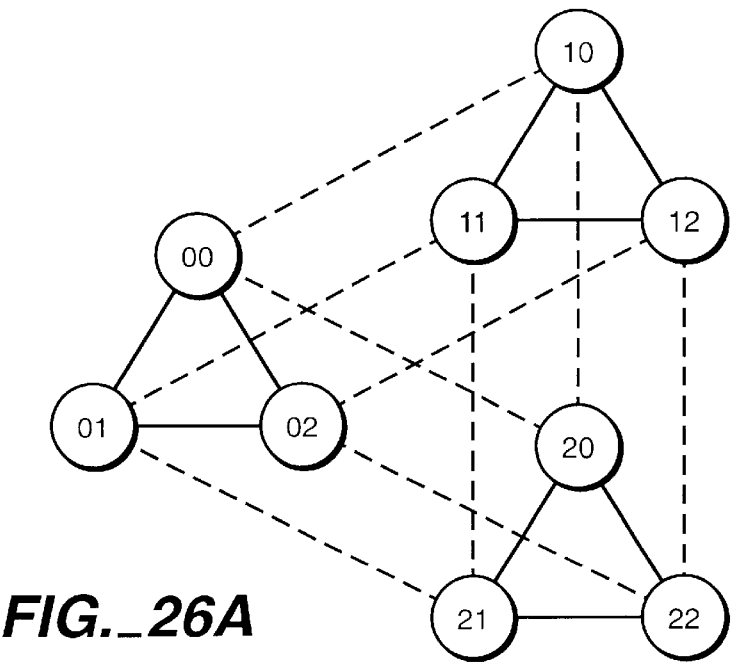
FIG._26A
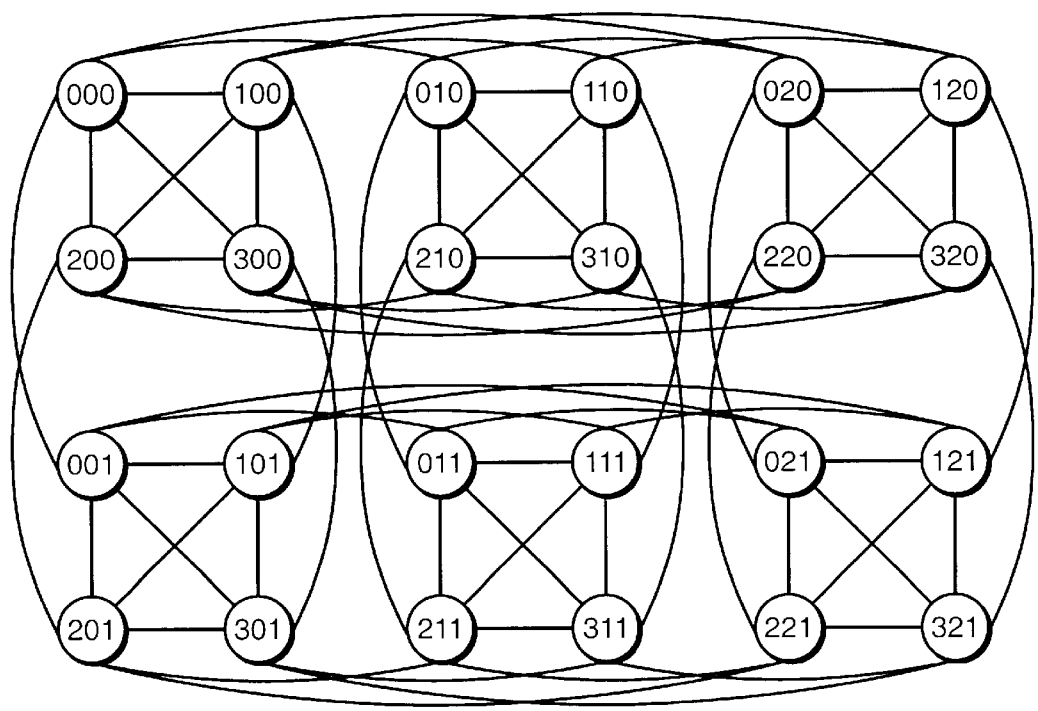
FIG._26B

FAULT-TOLERANT, HIGHLY-SCALABLE CELL SWITCHING ARCHITECTURE

BACKGROUND OF THE INVENTION

1. Field of the Invention

The present invention relates to cell switching architectures, particularly fault-tolerant cell switching architectures.

2. State of the Art

As changes in the field of networking and telecommunications have occurred, it has become increasingly evident that existing time division switches are inadequate for handling the bandwidth requirements of emerging cell switching technologies such as Asynchronous Transfer Mode (ATM). Cell switching involves breaking data into small, fixed-size units. A standard ATM cell has a payload of 48 bytes. A packet, by contrast, may be considerably longer and is not fixed length. A cell switch accommodates packet data by breaking packets up into cells.

New technologies are needed to provide the ultra high bandwidth switching capability being sought in the near future. A challenge is to efficiently implement switches with a large number of physical ports (128-2K ports) operating at gigabit data rates (0.5–10 Gbps/port) and having 0.1 to 10 terabits/second aggregate bandwidth capacities.

Current telecommunications switch systems are typically based on the crossbar, shared memory, or shared medium (e.g. bus and ring) switch architectures. While these architectures are adequate for today's networking applications, scaling them to meet future switching demands presents a formidable challenge. There are substantial engineering tradeoffs to take into consideration when deciding on a switch architecture that has to scale to over 1000 physical ports and operate at gigabit port data rates. Physical packaging issues become very important. Technologies, architectures and systems which have worked well for a 64 port switch operating at 155 Mbps per port are impractical for a 1000 port switch operating at 1 Gbps per port. For example, both the interconnect and circuit complexity of a crossbar switch with N input/output ports grows as $O(N^2)$, making it impractical for network sizes of 1000 ports and above. Likewise, both shared memory and shared medium architectures become impractical if not infeasible beyond a given switch size due to speed limitations in the sequential access of a single shared resource.

Self-routing multistage networks have also been proposed as the basis for high-performance packet networks for telecommunications in the form of ATM switches. The basic appeal of multistage interconnection networks lies in their inherent simplicity and their scalability to large numbers of ports. For example, U.S. Pat. No. 5,541,914, incorporated herein by reference, describes a class of packet-switched, extended-generalized-shuffle, self-routing multistage interconnection networks (MINs). The network provides a performance/cost trade-off between, on the one hand, the knockout switch or buffered crossbar and, on the other hand, the tandem banyan network. Multiple copies of the network may be serially cascaded back-to-back, and connected in parallel. Applications to broadband telecommunications switching are described.

MIN-based switching architectures, however, do not enjoy inherent fault tolerance. Achieving fault tolerance generally requires over-dimensioning the switch, cascading multiple MIN switching networks, etc. These solutions are complex, expensive, and inelegant.

A different problem is that of providing an interconnection network for massively parallel processing (MPP) computers having thousands of compute nodes. MPP interconnection networks, like switching networks, require high bandwidth and fault tolerance. One MPP interconnection network is that of Danny Hillis's well-known Connection Machine, described in U.S. Pat. No. 4,598,400. In the Connection Machine, a hypercube architecture is used for communication between clusters of processors. In that patent, a hybrid form of circuit and cell switching is used. On each routing cycle, an attempt is made to form a path from the source of a message packet to the destination. When successful, a message travels the entire path in a single routing cycle. In the event that a complete route is unavailable, the packet is delayed until the next routing cycle.

Some background regarding hypercubes is required for an understanding of the prior art and of the present invention.

A binary hypercube is defined in terms of graph theory. A graph is a set G={VE} where V is a set of nodes (also called vertices) and E is a set of edges connecting the nodes. In general, a graph can have any number of nodes and any number of edges up to the number of edges in a completely connected graph which is limited to $v(v-1)/2$ where $v=|V|$ (or the size of the set V). A binary hypercube is defined in the following way:

A D-dimensional binary hypercube is a graph G={V, E}. V is a set of $2^D$ nodes where each node is given a unique D-digit binary number as an address. An edge exists between two nodes if their addresses differ in exactly one digit.

FIG. 25 shows the first three non-trivial binary hypercubes. A 0-dimensional binary hypercube is simply a single node with no edges. FIG. 25(a) shows a 1-dimensional binary hypercube. There are two nodes in the 1-dimension and one edge connecting them. FIG. 25(b) shows a 2-dimensional binary hypercube. In this hypercube, there are four nodes and four edges. There is an edge between nodes 01 and 00 since their addresses disagree only in the second position. There is no edge between nodes 10 and 01 since the node's addresses disagree in both positions. Edges generated because addresses differ in the first position are said to be in the zeroth dimension; edges generated because addresses differ in the second position are said to be in the first dimension; etc. FIG. 25(c) shows a 3-dimensional binary hypercube. The hypercube addresses are constructed from right to left. Edges that exist because addresses differ in the right-most digit are said to be connecting nodes in the first dimension (or sometimes zeroth dimension if counting starts from zero); edges that exist because addresses differ in the second digit from the right are said to be connecting nodes in the second dimension; and etc. In the diagrams, edges in the first dimension are drawn vertically, edges in the second dimension are drawn horizontally, and edges in the third dimension are drawn diagonally.

Hypercubes have several properties. The number of edges in a D-dimensional binary hypercube is $d(2)^d/2$ since there an edge per dimension ending at a node, there are $(2)^d$ nodes and each edge has two ends (being bidirectional). The significance of this formula is that the number of edges grows proportionally to the number of nodes times the log of the number of nodes. If distance between nodes is measured as the number of edges in the shortest path between the two nodes, then the longest distance in a D-dimensional hypercube is D. If p is the distance between two nodes, then p! is the number of shortest paths between the nodes.

Comparing hypercubes to completely connected networks, although path length is always a constant 1 in a completely connected network, a completely connected network of n nodes requires n(n−1)/2 edges, meaning the number of edges grows proportionally to the square of the number of nodes. A hypercube, as already mentioned, has many fewer edges for large n. Comparing hypercubes to sparse networks such as rings, a ring of n nodes may require only n edges, but the maximum distance between two nodes is n/2 and there are only two paths between any two nodes. In a hypercube, the maximum distance between any two nodes is the log of the number of nodes, and there are many available paths. In addition, every node in a hypercube has the same structure: there are no special nodes like the nodes at the center of a star network, where the entire network is disconnected if the center is removed.

Two approaches to switching in hypercubes are circuit switching and cell switching. Circuit switching typically reserves an entire path for a data flow through the hypercube for an arbitrary duration, much like the end-to-end connection of a telephone call. The advantage of circuit switching is that arbitrary amounts of data may be transferred at wire speed along the circuit in-order and with low latency. The disadvantage is that the circuit consumes resources that will not be available to other data flows until the circuit is released regardless of how much data is actually being transmitted on the circuit. Cell switching requires all data packets to be of a fixed size (called a cell). No fixed paths through the hypercube are allocated. Instead, every node receives cells and determines locally on which edge to transmit the cell to move the cell closer to its destination. In cell switching, different cells of the same dataflow may traverse different paths from source to destination, and different dataflows may share the same path. This form of switching is also called store-and-forward or hop-by-hop routing.

Although hypercube architecutures have been used in MPP interconnection networks, the technical requirements within these two different application spaces (telecommunications switching and MPP interconnection) are considerably different. Reliability and speed are key issues for telecommunications. Telecommunications equipment must meet standards of reliability required within the telecommunications industry. This includes the reliability of service experienced by a customer as well as the dependability. If a customer has paid for data communications to support video transmission, then corrupted, late, or dropped data can result in unsatisfactory service. In an MPP network, late data may slow the speed of computation, but typically it does not invalidate a particular computation. In a telecommunications setting, a device must also be protocol capable to the extent needed by a particular context. Typically, telecommunications protocols are more complex than MPP communications protocols. An excellent technology for telecommunications switching might provide an excellent basis for an MPP interconnection, due to its more stringent requirements. The telecommunications switching technologies described herein are therefore believed to be equally applicable to MPP interconnection networks.

There is a need for a switching architecture that offers a powerful, simple, and in many ways elegant solution to the problem of providing cost-effective, high-bandwidth, fault-tolerant data switching.

SUMMARY OF THE INVENTION

Generally speaking, the switching architecture of the present invention offers a powerful, simple, and in many ways elegant solution to the problem of providing cost-effective, high-bandwidth, fault-tolerant cell switching. The architecture is based on a network of switching elements connected in a hypercube topology to form a switch fabric.

In the exemplary implementation, a node in the graph of a hypercube corresponds to a switching element. The edges in the graph of a hypercube correspond to the wires in the internal fabric of the switch. Each switching element is in some way attached to the outside world, which in a network is another switch or a communicating end station. A Source Sink Element (SSE) is a portion of the switch element that passes cells between the outside world and the switch fabric. A Saturated Constant Shuffle Router (SCS Router) is a portion of the switch element that together with connections to other SCS Routers implements the switch fabric.

The present invention is an example of cell switching, providing an efficient means for the transfer of data through a hypercube. A variety of features contribute to high Quality of Service (QoS) as measured by cell loss, cell delay and cell jitter (variance of cell delay). Zero cell loss is possible in theory, and in practice cell loss can be reduced to an arbitrarily-chosen statistical bound, as may be seen from an analysis of the inputs and outputs of an SCS router. Considering first internal links (neighbor to neighbor), D cells may be output from a switching element every cycle. Likewise, D cells may be input to an SCS router every cycle, one on each of D links. A small number Q of additional cells may be buffered within each SCS router providing additional candidates for routing and thereby increasing wire utilization. During a given cycle, the contents of a queue buffer may be delivered or transmitted on some wire or may be replaced to queue. The contents of a queue buffer may also be replaced by a cell received during the previous cycle. A switching element is therefore able to handle at least D+Q cells every cycle. The switching element's data source may also, on any given cycle, have a cell to inject into the fabric, for a worst-case maximum of D+Q+1 cells to be handled by the switching element during a given cycle. During the same given cycle, the switching element may or may not be able to output a cell to its data sink if there is no cell present with a zero routing code. If injection were allowed in this case, then a cell would have to be dropped by the router since there are only D+Q output channels available and D+Q+1 cells to route. Cell loss is avoided in this case by disallowing cell injection during the cycle. The data source is immediately informed of cell injection failure and may re-attempt cell injection during the following CEC. This behavior is distinct from and more efficient than head-of-line blocking encountered in many other switches. Fundamentally then, the switch is capable of zero cell loss.

Furthermore, by speedup of the switch fabric, the switch may be tuned to run at a point where cell delay is statistically bounded. A cell reordering mechanism prevents out-of-order cell delivery while maintaining acceptable limits of cell jitter. By tuning the mechanism appropriately, cell jitter may also be statistically bounded. A single data stream may send a stream of cells beyond the capability of a destination port to deliver due to cells received from other input ports. When data streams contract for specific QoS and inject cells only at or below the contracted rate, overloading an output port will not happen. When a datastream is not bound to a specific QoS, it may burst cells that would take resources from better behaved data streams of the same priority. Mechanisms to prevent adverse effects to better behaved data streams at a destination port are implemented using per-VC (Virtual Channel) queueing at an SSE.

The switching architecture provides for fault tolerance and congestion avoidance. In an exemplary embodiment, every switching element checks each of its links at regular intervals, preferably every cycle. (Dummy cells, or bubble cells, are exchanged on idle links.) In the case of repeated failure to receive a cell with a valid header on a given input link, a corresponding output link is marked as faulty, and traffic is routed around the faulty link. That is, if a switching element notices that it is unable to receive cells from a neighboring switching element, then it will not send cells to that neighboring switching element. This same fault tolerance feature allows for incremental switch sizing, partial hypercube configurations, and the ability to dynamically add to or remove from the fabric. Switching elements that are not physically present have their links marked as faulty by those switching elements that are present such that no traffic is routed to or through the missing switching elements.

In any switch, output channel congestion can occur when multiple sources send to a single destination and the combined data rate of the sources exceeds the destination's maximum bandwidth. The ATM data protocol attempts to minimize this possibility by providing bandwidth contracting and policing of data sources. Important legacy data protocols, like IP, typically do not make use of these facilities and suffer output channel congestion. Standard strategies for handling output channel congestion including injection packet discard (IPD), early packet discard (EPD) and partial packet discard (PPD) take advantage of packetized data to minimize packet retransmission after cell loss due to output channel congestion. Data is packetized when a data protocol segments arbitrarily large amounts of data into streams of contiguous, fixed-length cells. In ATM, the last cell of a data packet is indicated in the ATM cell header by the packet boundary indicator (PBI). When a single cell of a packet is lost, the entire packet must be retransmitted. Since the packet will be retransmitted, the various packet discard strategies minimize congestion by actively dropping the remaining cells of a packet (not including the last cell with the PBI) to eliminate current congestion. In the exemplary embodiment, an output channel congestion avoidance mechanism is implemented using trouble indicator bits contained within a header of each cell. Output channel congestion is evident in a switching element retrograding cells for which it is the destination because delivery channels are full. Congestion is relieved by sending messages to the sources of such traffic to turn them off. Messaging may be accomplished through a central facility or in a distributed manner by flooding the cube with messages containing information that a particular switching element is congested. Sources receiving a congestion message for a particular switching element enter a packet discard mode in which packets destined for that switching element are discarded.

BRIEF DESCRIPTION OF THE DRAWING

The present invention may be further understood from the following description in conjunction with the appended drawing. In the drawing:

FIG. 1 is a block diagram of a hypercube-based telecommunications switch in accordance with an exemplary embodiment of the invention;

FIG. 2 is a block diagram of one of the switching elements of FIG. 1;

FIG. 3 is a block diagram of the router of FIG. 2;

FIG. 4 is a diagram of a cell format;

FIG. 5 is a diagram illustrating source-sink processing;

FIG. 6 is a diagram illustrating data structures within flow memory;

FIG. 7 is a diagram illustrating a format of an ingress Virtual Call Record (VCR);

FIG. 8 is a diagram illustrating a format of an egress VCR;

FIG. 9 is a diagram illustrating the use of "ragged tail" queues for cell resequencing;

FIG. 10 is a diagram illustrating one implementation of ragged tail queues for cell resequencing;

FIG. 11 is a diagram illustrating a format of a Virtual Channel Queue (VCQ) entry;

FIG. 12 is a diagram illustrating a format of a forward queue entry;

FIG. 13 is a diagram illustrating a format of a local processor queue entry;

FIG. 14 is a diagram illustrating a format of an egress output queue entry;

FIG. 15 is a diagram illustrating a format of a fabric inject queue entry;

FIG. 16 is a block diagram illustrating an ingress function of the SSAC of FIG. 2;

FIG. 17 is a block diagram illustrating an egress function of the SSAC of FIG. 2;

FIG. 18 is a block diagram illustrating a centralized mechanism for output port congestion avoidance;

FIG. 19 is a block diagram illustrating a distributed mechanism for output port congestion avoidance;

FIG. 20 is a block diagram illustrating an exemplary physical implementation of a hypercube-based telecommunications switch; and FIG. 21 is a block diagram illustrating another exemplary physical implementation of a hypercube-based telecommunications switch.

FIG. 22 is a block diagram illustrating the function of priority selection tree element.

FIG. 23 is a block diagram illustrating an exemplary physical implementation of a priority selection tree.

FIG. 24 illustrates the pinout of an exemplary SCS router chip.

FIG. 25 illustrates the first three binary hypercubes.

FIG. 26 illustrates generalized hypercubes.

DETAILED DESCRIPTION OF THE PREFERRED EMBODIMENTS

The following terms and abbreviations are used herein:

TABLE 1

| | Glossary |
|---|---|
| ABR | Available Bit Rate |
| ATM | Asynchronous Transfer Mode |
| CBR | Constant Bit Rate |
| CEC | Cell Exchange Cycle of SCS Router |
| CLP | Cell Loss Priority field in ATM cell header |
| EPD | Early Packet Discard - packet discard mode where entire packet discarded in anticipation of buffer overflow |
| egress | referring to the SSE component that handles cells exiting the switch |
| Gbps | Gigabits Per Second |
| GFC | Generic Flow Control - field in ATM cell header |
| HEC | Header Error Correction - field in ATM cell header |
| HOL Blocking | Head of Line Blocking - Occurs in input buffered switches when a cell at head of input queue can't be accepted by switch because the required output resource is unavailable, but prevents a following cell whose output resource is available from moving through switch. |
| hotspot | a sink whose delivery capacity has been exceeded |

TABLE 1-continued

Glossary

| | |
|---|---|
| sink | and deliverable cells are being retrograded |
| ingress | referring to the SSE component that handles cells input to the switch |
| MIN | Multi-Stage Interconnection Network |
| IP | Internet Protocol |
| IPD | Injection Packet Discard - packet discard mode at ingress SSE(s) initiated to alleviate congestion at egress SSE |
| OAM | referring to Operations and Maintenance cell - as indicated by a setting of the PTI field. Switch avoids discarding OAM cells, and may perform additional control processing on them. |
| PCB | Printed Circuit Board |
| PCR | Peak Cell Rate - cell transmission rate negotiated at call setup for ATM calls. Limits the burst rate of a call. |
| PPD | Partial Packet Discard - packet discard mode where remainder of packet discarded upon buffer overflow |
| PBI | Packet Boundary Indicator - a setting of PTI field to indicate the end of the packet. Switch avoids discarding a PBI cell. |
| PTI | Payload Type Indicator - field in ATM cell header |
| QoS | Quality Of Service |
| SCR | Sustained Cell Rate - cell transmission rate negotiated at call set-up for ATM calls. Limits the aggregate bandwidth consumed by the call. |
| SCS Algorithm | Saturated Constant Shuffle Routing Algorithm for Hypercubes |
| SCS Router | Switch Fabric Element implementing SCS Algorithm |
| SE | Switching Element: a router (e.g., SCS Router), typically coupled with an SSE. |
| sink | destination port of call |
| source | input port of call |
| SONET | Synchronous Optical Network |
| SSAC | Source Sink ATM Controller - ATM specific SSE |
| SSE | Source Sink Element - provides ingress and egress port functions for hypercube generic cell switch |
| UBR | Unspecified Bit Rate |
| VBR | Variable Bit Rate |
| VC | Virtual Channel - shorthand for call switched on VC basis |
| VCN | Virtual Channel Number - internal switch call identifier, serves as index to VCR in VCR Table |
| VCOP | Virtual Channel Output Process - cell output process to manage access to output process |
| VCQ | VC Queue - per VC private queue space used for resequencing incoming cells and buffer output ready cells at egress port of switch |
| VCR | Virtual Channel Record - stores call state information at switch ports |
| VCR Table | Virtual Channel Record Table - table of call state information |
| VLSI | Very Large Scale Integration |
| VP | Virtual Path - a logical association or bundle of VCs |
| VPI/VCI | Virtual Path Identifier/ Virtual Channel Identifier - ATM cell header field identifying call |

The binary hypercube interconnection network is the hypercube network on which the exemplary implementation is based. As such, the term hypercube will be used interchangeably with binary hypercube. If another form of hypercube is intended, then that hypercube will be qualified to indicate the particular variety of hypercube. Generalized hypercubes are discussed later.

The invention presented uses a short, fixed length header attached to each cell to provide (among other things) routing information to guide the cell from its source switching element to its destination switching element. The source switching element is the switching element which receives the cell from its external entity. The destination switching element is the switching element that delivers the cell to its external entity. Data received from the outside world at a source switching element is said to be injected into the switch. The path in the switching element from the outside world to the wires of the fabric is the ingress path through the switching element. Data sent to the outside world at the destination switching element is said to be delivered. The path in the switching element from the wires of the fabric to the outside world is the egress path.

A routing code (RC) is calculated to guide a cell in its hop-by-hop path from source to destination. The routing code of a cell is defined as the bitwise exclusive or of the source and destination addresses. Exclusive or is the binary operation which results in a 0 if two operands are the same and 1 if they differ. Bitwise exclusive or applies the exclusive or operation to pairs of bits in two bit strings. In the case of hypercube addresses, each digit of the hypercube address represents a location in a dimension. Bitwise exclusive or (XOR) of two hypercube addresses determines in how many dimensions the two addresses differ. In the case of the example hypercube given in FIG. 25(c), given a cell injected at node 100 and destined for node 111, the routing code is 011 since 100 XOR 111=011. The routing code guides the cell through the hypercube. A 0 in the first digit of the example routing code indicates that the cell need not travel on any of the diagonal (third dimensional) edges to arrive at its destination. The cell must travel on one vertical and one horizontal edge, although whether it travels first to 101 or 110 is not important to the cell's progress. When a cell travels an edge, the digit of the routing code corresponding to the edge traveled is flipped: if the digit is 1, the digit is set to zero and if the digit is zero, it is set to 1. If the example cell injected at 100 with a routing code of 011 were transmitted to 110, then the routing code at 110 would be 001. If the cell were then transmitted on the edge to 111, then the routing code would be 000 indicating that the cell had arrived at its destination and could be delivered.

In a switching network, a particular edge or edges may be unavailable to a cell when a routing decision is made. In this case, a cell may be sent along an edge that does not bring the cell closer to its destination. For example, if the cell above were at node 100 with routing code 011 and both the edges to nodes 110 and 101 were unavailable to the cell, it might be sent along the edge to node 000. If this happened, the routing code would become 111. In this way, the routing code at the node 000 would still indicate the eventual destination of the cell to be node 111 although the transmission from 100 to 000 would not represent forward progress.

Forwarding is defined as the transmission of a cell that results in a previously non-zero digit of the cell's routing code becoming zero. Retrograding is defined as the transmission of a cell that results in a zero digit of the cell's routing code becoming non-zero. Forward motion means that the length of the shortest path between the current location of a cell and its destination has been reduced by 1. Retrograde motion means that the length of the shortest path has increased by 1. The length of a shortest path between a cell and its destination are the number of non-zero digits in its routing code. In essence, the routing code embodies all possible shortest paths for a cell, since no particular edge traversal order is implied, but given any order of edge traversals and if the cell only experiences forward moves, the path traveled by the cell will be a shortest path.

In addition to routing code, the internal cell header includes a cell priority field. Priority is a number from zero to some number p indicating the relative importance of the cell. For example, cells of data streams requiring low cell transfer delay and jitter might be assigned a high priority while cells of data streams that can tolerate long transfer delays might be assigned a low priority.

Given these definitions, it is possible to define a Saturated Constant Shuffle (SCS) routing algorithm for a D-dimensional hypercube. The SCS routing algorithm is a distributed algorithm where each node in the hypercube performs the same actions independently. The algorithm may run synchronously or asynchronously. In either case, each node is exchanging cells on each of its edges on a regular basis. This regular exchange of cells is called a cell exchange cycle (CEC). In a synchronous system, a CEC is a fixed time. In an asynchronous system of nodes, the CEC will synchronize with the slowest node in the system, with the option of considering nodes with clocks slower than some threshold as being non-functional. In every CEC each node sends and receives a cell on each of its edges as well as its external links. If there is no valid data to send on a link then a bubble cell is sent (or received) on the link to indicate the absence of data. In addition, each node has internal data storage provided for an arbitrary (but limited) number of cells. Holding a cell over a CEC is called queueing. The SCS algorithm determines what cells to send out what edges of a node. When an output edge has been assigned to a cell, that edge is unavailable to any other cell until the next CEC. The following logic is used to determine output edge assignment:

For each cell priority
    for each cell (considering queued cells first, then cells received last CEC, and finally an injected cell if there is one)
        attempt to deliver the cell if the RC is zero
        else attempt to assign a forward edge
        else attempt to assign a queue position
        else attempt to assign a retrograde edge In addition, when a cell is queued or suffers retrograde motion, the cell's priority is boosted. A cell's priority may only be boosted once regardless of how many times the cell is queued or retrograded. If all initial priorities are even numbers, then this boosting of priorities results in considering a cell that has already suffered from congestion in its travel through the cube before other cells of the same class.

In terms of the SCS algorithm, delivering a cell with a zero routing code is considered to be the same as forwarding since a cell with a zero routing code can never be forwarded and a cell with a non-zero routing code can never be delivered.

A consequence of the SCS algorithm is that cells of one data stream can follow different paths to their destination. This means that cells may arrive in a different order than their injection order if some cells are queued or retrograded. Reordering is therefore required at the destination.

A second consequence of the SCS algorithm is that it is possible that a cell will travel in the fabric but never arrive at its destination due to congestion from the same or higher priority cells. A third number carried in the SCS header is called the cell lifetime. The cell lifetime is used to prevent a cell from wandering forever in the fabric. When the cell lifetime is reduced to zero, the cell is dropped. It is sufficient to decrement cell lifetime when a cell is queued or retrograded, although cell lifetime can be decremented on each transmission through the fabric. Decrementing only on a non-forward movement reduces the number of bits required to represent the lifetime.

In a switching element, the logic required to support the SCS algorithm divides cleanly into internal and external tasks. Internal tasks relate to passing cells between switching elements and performing the SCS algorithm. External tasks relate to injection of cells from an external source to the internal task or delivery of cells from the internal task to the external destination. The internal task is called the SCS Router. The external task is called the source-sink element (SSE). The ingress path of the SSE handles the addition of the internal header to a data cell and injection of the cells to the SCS router. The egress path of the SSE handles the delivery of cells from the SCS router and all tasks needed for delivery of the cells to the external entity including header translation (if needed) and cell reordering.

The exemplary implementation of the invention uses a 6-dimensional binary hypercube to implement the switch fabric. Each SCS router is a node in a six dimensional hypercube.

The exemplary implementation uses ATM as the basic data protocol. Using ATM impacts the SCS router portion of a switching element marginally by setting data payload size at 48 bytes. Using ATM impacts the SSE portion more substantially. On the ingress side of the SSE, the ATM cell header is used to identify data streams of injected cells to determine cell destination and internal cell header creation. On the egress side of the SSE, internal cell header is used for translation to the new ATM cell header. The external links of the exemplary implementation are Utopia links, a standard data bus definition. The Utopia links are fed through SONET hardware to fiber or UTP-5 cabling running at OC-3 speeds. Choice of a data protocol other than ATM would result in different, but analogous tasks in the SSE and difference in the SCS router relating only to the size of the data payload.

Referring now to FIG. 1, a block diagram of a binary hypercube-based cell switch 100 in accordance with an exemplary embodiment of the invention is shown. For purposes of the present example, D=3. At each of the nodes is located a switching element SE 200, which is assigned a three-bit binary address. Each of the switching elements is placed in communication with a control processor 101 that performs overall control of the cell switch. Communications with the control processor may be direct, via a shared bus, or through the switch fabric. Control processing may be performed by a single external processor or distributed throughout the switch to the switch elements themselves.

Referring to FIG. 2, a block diagram of one of the switching elements of FIG. 2 is shown. A SCS router 300 is coupled by bidirectional links to SCS routers of neighboring switching elements, in a binary hypercube configuration. Each bidirectional link may in actuality be a pair of unidirectional links. Taken together, the SCS routers and their interconnecting wires form a switch fabric, or switch core.

Within each switching element, getting data traffic into and out of the switch fabric while ensuring high QoS is the responsibility of a Source/Sink Element (SSE). In the case of an ATM switch, a Source/Sink ATM Controller, SSAC provides the SSE function. The SSAC interfaces with the SCS router on the switch fabric side and, on the data network side, to a conventional broadband communications circuit such as a SONET chip 205. In the example of FIG. 2, the SONET chip provides a physical interface to the data network. On the SCS router side, delivery of cells from the switch fabric occurs over multiple channels, e.g., two channels in the illustrated embodiment. Injection of cells to the switch fabric occurs through a single channel. On the data network (e.g., SONET) side, cell delivery and cell receipt between the SSAC and the SONET chip occur through a conventional Utopia interface.

The SSAC is provided with memory that, in operation, is partitioned into Cell Memory and Flow Memory. Cell memory 207 is used to hold cell payloads.

Flow memory 600 is used to hold call records and queue data. Operation of the SSAC is described in greater detail hereinafter.

A local (possibly shared) processor 203 provides control to the various elements of the switching element through a standard microprocessor interface. The local processor's tasks include general error response, statistics gathering, call setup and teardown, and switch fabric topology adjustment. In addition, any distributed control processing is performed at the local processor. A single local processor may be shared among several SE's.

Referring to FIG. 3, a block diagram of the SCS router of FIG. 2 is shown. In the illustrated embodiment, the SCS router is based on a six-dimensional binary hypercube. Each dimension of the binary hypercube requires two ports, one for incoming cells and one for outgoing cells. The SCS router also has one inject port from the SSAC, multiple (e.g., three) delivery ports to the SSAC, and two internal queue buffers.

The SCS router includes five basic blocks: a state machine 301, a cell block 303 (including cell buffers and queue buffers), row selection logic 305, column assignment logic 307, and a small crossbar switch 309. The row selection logic and the column assignment logic together form cell assignment logic 310. The function of each of these blocks is described below.

The state counter 301 controls the SCS router. In particular the timing control for output column assignment and other events within the SCS router are provided by the state machine.

The cell block 303 is where cells are buffered as they pass through the SCS router. In an exemplary embodiment, memory requirements are minimized by storing both a currently incoming and a currently outgoing cell in a single cell buffer. To keep addressing simple, cells for a given incoming row are always written to the same buffer. Sharing a single buffer requires that data of an outgoing cell be read from a given memory location before data from the incoming cell is written this is accommodated through the use of Pipeline register stages (not shown). The number of pipeline register stages determines the number of cycles that a memory location should be read in advance of its being written. That number is equal to the number pipeline register stages.

The SCS cell format includes an SCS cell header and a payload. In general the payload can be the complete data network cell (be it ATM or other) received by the switch, while the header contains SCS router specific information necessary to transmit the cell across the switch. In the exemplary embodiment, to save space the ATM header information is integrated with the SCS header, and the cell payload is exactly the ATM cell payload as shown in FIG. 4. The SCS cell carries 48 bytes of payload and 44 bits of header information.

Payload data is untouched by the SCS router—it is received from an incoming ATM cell and is delivered to an outgoing ATM cell. The meaning of the various header fields is set forth in Table 2.

TABLE 2

| Field | Bits | Meaning |
| --- | --- | --- |
| Validity | V[1:0] | Cell Validity<br>V = 10: cell is Valid<br>V = 01: cell is bubble cell<br>V = 11 or V = 00: cell is invalid |
| Priority | P[2:0] | Cell Priority<br>P = 110: CBR<br>P = 100: VBR-nrt<br>P = 101: VBR-rt<br>P = 010: ABR<br>P = 000: UBR<br>Others reserved for expansion |
| Payload Type Indicator | PT[2:0] | Payload Type Indicator from ATM header<br>PT = 0X1: PBI cell<br>PT = 1XX: OAM cell |
| Routing Code | R[0:7] | Directs SCS routers in routing the cell.<br>In D = 6 implementation, R[6:7] are unused |
| Lifetime | L[3:0] | Number of retrograde or queue moves allotted a cell before it becomes subject to discard. |
| Suffer Bit | SB | Set by switch element when cell retrograded or queued. Boosts cell priority for its duration in the switch fabric |
| Sequence Number | S[5:0] | Used to resequence out-of-order cells prior to delivery to data network. |
| Virtual Channel Number | VC[13:0] | Stream Identifier |

Valid bits are set by the SCS router depending on the state of the outgoing link. If a link has a cell to send, the bits are marked as valid. If a link is idle the bits are marked to indicate a bubble cell. Any other combination of the valid bits constitutes an invalid cell, and the receiving SCS router notes the error condition in a link error counter.

The priority bits are used by the SCS router in determining cell order when assigning SCS router resources. Given the priority of cell "a" numerically greater than the priority of cell "b", cell "a" is allocated resources before cell "b". In the exemplary embodiment four ATM traffic classes are supported as indicated in Table 2.

The payload type indicator is used by the fabric to determine if a cell can be dropped. Packet Boundary Indication cells and OAM cells are never dropped by the fabric if a routing resource is available. Other cells may be dropped if their lifetime expires or are deliverable cells being retrograded. The PTI bits are also preserved for translation back to an ATM cell at the egress port.

The routing code directs the fabric when switching the cell. For each bit set to "1" in the routing code, the fabric must route the cell across the corresponding dimension, after which the bit is negated. When the routing code is all "0"s, the cell is deliverable, i.e. its current SCS router can deliver the cell to its SSAC.

The cell lifetime limits the number of retrograde and queue moves a cell may make in fabric. It is initialized at the source SSAC. For each retrograde or queue move made by a cell, the lifetime is decremented. Once the lifetime reaches 0, a switching element has the option of discarding the cell. Certain cells may not be subject to cell discard (i.e. Packet Boundary Indication or OAM cells).

The suffer bit is initially set to 0 on all cells. A switch element sets the bit to 1 for cells that are retrograded or queued. This enhances the cell's priority when selecting cells for routing.

The sequence number is set by the ingress SSAC. It is unused by the fabric. The egress SSAC uses the sequence number to resequence out-of-order cells.

The VCN is a stream identifier set by the ingress SSAC. Again, the fabric ignores this field. The egress SSAC uses the VCN to access the call state information relevant to the cell.

Referring again to FIG. 3, the crossbar 309 provides the interconnect between rows and columns of the SCS router. Incoming links feed the rows of the router, while the columns feed the outgoing links. In an exemplary embodiment, the number of rows is given by D+Q+In, where D is the dimensionality of the binary hypercube, Q is the number of queue buffers in the cell block, and In is the number of incoming links from the SSE. The number of columns is given by D+Q+Out, where Out is the number of outgoing links to the SSE. In the embodiment of FIG. 3, D+Q+In=6+2+1=9 and D+Q+Out=6+2+3=11. The crossbar connections are assigned by the column assignment logic in conjunction with the row selection logic. Each column is assigned a row code which is used to direct the cell from the appropriate row into that column. Together, the row selection logic and the column assignment perform a function like that of an arbiter, performing prioritized assignment of resources (links and queue buffers).

The row selection logic 305 selects the order in which rows or incoming cells are passed to the column assignment logic based on cell priorities and suffer bits (see Table 2). The cells are identified in order to the subsequent column assignment logic, one at a time at intervals. In an exemplary embodiment the row selection logic is implemented by priority selection tree to reduce the depth of logic. Referring to FIG. 22, a priority selection tree element (PSTE) examines relevant information from two cells, selects one, and passes that information on. A priority selection tree is composed of binary tree of PSTEs. Referring to FIG. 23, a priority selection tree for a D=6 SCS Router is shown.

The column assignment logic 307 controls the routing of cells by computing crossbar crosspoint settings for the next CEC based on currently incoming cells. These settings are loaded to the crossbar at the end of the CEC. In particular, the column assignment logic first determines the available links (links not disabled or previously allocated during this assignment cycle) for forward, queue and retrograde paths. By an elimination process where forward paths take priority over queue paths and queue paths take priority over retrograde paths, a single column for the current row is obtained.

Additional blocks not shown in FIG. 3 provide additional functionality including link test logic, local processor interface functions, cell validity counting, invalid cell discard, and cell lifetime adjustment. Some of these functions will be further described below.

Cell validity codes are examined by link test logic as cells enter the SCS router from neighboring SCS routers. If an invalid cell is discovered, a link-specific counter is incremented, and the cell is discarded. The contents of the counter can be examined or cleared at any time through the local processor interface. The most significant bit of all counters is ORed together to provide an interrupt signal to the local processor. An invalid cell code occurs if a link does not exist because the neighboring SCS router is not present (i.e., the switch core is a partial binary hypercube), or the link itself is missing or broken. The corresponding link line is floating, registering to the SCS router a continuous stream of invalid cells and generating an interrupt to the local processor by reason of a high link error count. The local processor then disables the bidirectional link either to avoid cell loss due to a faulty link or SCS router, or to reduce the input flow to match a reduced output capacity of the neighboring SCS router.

Through the micro processor interface and the directly addressable registers in the SCS router, the local processor performs router configuration and accesses statistics in the router. The SCS router alerts the local processor of link error conditions via an interrupt signal. The local processor controls which links error conditions it responds to through the interrupt mask. In an exemplary embodiment, the following processor commands are defined:

TABLE 3

| Command | Description |
| --- | --- |
| read dim 0 invalid cell count | Returns invalid cell count for appropriate dimension. Local processor can then determine whether link faulty or not |
| read dim 1 invalid cell count | |
| read dim 2 invalid cell count | |
| read dim 3 invalid cell count | |
| read dim 4 invalid cell count | |
| read dim 5 invalid cell count | |
| read invalid cell count most significant bits | Returns most significant bits of all invalid cell counters. This enables local processor to quickly determine the source of interrupt from SCS router |
| read usable link settings | Returns current usable link settings for appropriate group of links, as previously set by local processor |
| read usable delivery links | |
| read allow retrograde settings | Returns current allow retrograde settings, as previously set by local processor |
| read interrupt mask | Returns current interrupt mask, as previously set by local processor |
| clear dim 0 cell count | Clears the count of the appropriate invalid cell counter. |
| clear dim 1 cell count | |
| clear dim 2 cell count | |
| clear dim 3 cell count | |
| clear dim 4 cell count | |
| clear dim 5 cell count | |
| write usable links settings | Sets the usable links, which controls which output links are selected by column assignment in the SCS router |
| write usable delivery links settings | |
| write allow retrograde settings | Sets the allow retrograde registers, which control which deliverable cells are retrograded. Each traffic priority has its own allow retrograde register. |
| write interrupt mask | Set interrupt mask which controls which interrupt conditions result in interrupt to local processor |

The SCS router lends itself well to realization as a VLSI chip, and in fact multiple SCS routers can be realized on a single chip. Pinout savings result from a multiple SCS Router chip implementation since off-chip router-to-router connections in a single router implementation become internal connections in the multiple chip-solution. Referring to FIG. 24, a pinout of a exemplary SCS router chip is shown.

From the foregoing description, the manner in which cells traverse the switch fabric may be readily understood. The following description focuses on source-sink processing, or ingress and egress processing, i.e., the manner in which cells enter and leave the switch fabric.

Referring to FIG. 5, egress processing begins when a cell reaches its destination SCS router whereupon, if an delivery channel is available, it is output to the SSAC associated with that SCS router. To increase delivery channel availability, multiple delivery channels are provided, e.g., three. Cells are stored in cell memory. A selection process then selects cells, one at a time, for further processing.

Further processing starts with redirection of control cells to the local processor. Control cells are exempt from the remaining egress processing. Non-control cells are then subject to packet discard processing, including Early Packet Discard (EPD) and Partial Packet Discard (PPD). Packet discard occurs when queue resources are full or if some previous cell of the packet has been discarded by the switch. A cell data protocol accommodates packet data by breaking packets up into cells. The last cell in a packet has a Packet Boundary Indicator (PBI) set. The rationale for packet discard is if even one cell of a packet is dropped, the whole packet must be retransmitted anyway, so the current packet should be dropped to free up resources in the switch. Early Packet Discard occurs when the sink discards the entire packet because it anticipates queue overflow once the entire packet is received. Partial Packet Discard occurs when the remainder of a packet is discarded because a previous cell in the packet either was discarded by the switch or caused queue overflow. In the exemplary embodiment, cells are buffered in per Virtual Channel Queues (VCQ). Each call is provided with private queueing space. EPD and PPD are performed within the context of these VCQs.

Ordinarily, a packet's VCQ will not overflow and the packet will not be discarded. Rather, cells belonging to the packet will be queued in their respective VCQ. Each VCQ holds cells of one and only one Virtual Channel, an arrangement known as per-VC queueing. Per-VC queueing prevents cells of different Virtual Channels from interfering with each other. Without per-VC queuing calls would share queuing space. Shared queuing space creates the potential for unfair cell buffer allocation. Well-behaved calls could be denied buffer space due to other calls bursting to the same port. As buffer space runs out, all calls would go into packet discard. With per-VC queuing the well-behaved calls are protected from bursting calls which get a limited amount of buffer space. Any packet discard is limited to those calls that exceed their buffer allocation. Per-VC Queueing is not without its costs, and a successful switch implementation does not require its use. Shared Queueing, while not providing the inter-call protection of VC Queueing, can potentially greatly reduce buffering resources required at a switch port.

A Virtual Channel Output Processing (VCOP) management process takes cells from the VCQs and outputs them to the output port. VCOP management involves multiple intermediate egress output queues, access to which is governed by a cell limit established at call setup. When a call has cells ready for output, its cells are pushed onto the appropriate output queue until its cell limit is reached. The limited access forces fairness on those calls sharing a queue. Thus some cell burst from a call is not permitted to fill the output pipe with it own cells, and add long delays to cells from other calls. But the access limit does not constrain any call to less than full use of the output channel when all other calls over the port are idle. As a cell is removed from a queue for output, VCOP pushes a new cell from the same call (if available) onto the queue to keep the call's queue allocation maximized.

The last part of VCOP management is queue selection when the output channel becomes available. VCOP selects the next cell for output from the highest priority non-empty queue. Cell selection from the queues could be modified to a weighted round robin between the queues to ensure a minimum level of access to the output channel for all traffic classes.

The last step in egress processing is cell translation, whereby a cell selected for output is translated from the internal switch format to a standard format (e.g., standard ATM cell).

Ingress processing occurs when a cell is received on the input port. The first component of ingress processing is flow control policing. Flow control policing ensures that a cell source is abiding by its service contract entered into at the time of call setup. Traffic in violation of its service contract is either discarded or marked as discardable. In the exemplary embodiment policing is done using up to two leaky buckets. Traffic whose service contract specifies an unconstrained cell rate (i.e. Best Effort) uses no leaky buckets. A single leaky bucket is used for traffic where only a Peak Cell Rate (PCR) is specified in the service contract. Two leaky buckets are used when the service contract specifies both a PCR and a Sustained Cell Rate (SCR).

From flow control policing a cell proceeds to the Injection Packet Discard (IPD) process. Output port congestion may result from multiple sources bursting to a single sink. Injection Packet Discard (IPD) is activated upon detection of sink port congestion and acts to reduce congestion by dropping a packet(s) at the ingress port of the switch. The IPD process is described in greater detail hereinafter.

Another entry point to the ingress process comes from the local processor. Cells received from the local processor are input following the IPD process, and thus avoid flow control policing and IPD processes.

Next, a multicast process follows, preceding actual injection of cells into the switch fabric. In the multicast process, multicast cells are replicated for each of their destinations. Cells that are not multicast are unaffected.

The last step in ingress processing is header translation. Header translation involves replacing the ATM header with the fabric header or extending the complete ATM header with an SCS header. In an exemplary embodiment, the fabric header contains fabric specific information, a call record index, a resequencing ID, and the PTI field from the ATM header, as described in Table 1.

A more detailed understanding of the ingress and egress processes may be obtained from a consideration of the data structures employed within flow memory in accordance with an exemplary embodiment of the invention. Whereas cell payloads are stored in cell memory, cell indices (sometimes referred to as cell pointers) are manipulated within flow memory instead of the cells themselves. This distinction should be borne in mind throughout the following description.

Referring to FIG. 6, on the egress side, flow memory includes an egress call record or Virtual Channel Record (VCR) table 601, a local processor queue 603, a per-VC queue area 605 (containing a number of active queues equal to the number of active calls, or Virtual Channels), a forward queue 607, and a Utopia queue area 609 (containing, for example, two queues). On the ingress side, flow memory includes an ingress VCR table 611, a SCS router inject queue 613, and a VPI/VCI lookup table 615. The call identifier used outside the switch by ATM cells is the VPI/VCI field. Within the switch, a compressed call identifier or Virtual Channel Number (VCN) is used. The lookup table is used to translate the VPI/VCI of an incoming cell to a VCN used as an index into the ingress VCR table.

The ingress and egress VCRs control a cell's progress through the SSAC. Some fields may be replicated within the VCRs to reduce memory operations by the SSAC. Cells not corresponding to valid VCRs are discarded.

Referring to FIG. 7, the format of an ingress VCR is shown. In an exemplary embodiment, the ingress VCR contains six words, Word 0 through Word 5. Word 0 contains, in large part, cell header information (see Table 1), including routing code, cell lifetime, and sequence number. Other fields in Word 0 include Seqlim, VCN and class. The Seqlim field contains the number of sequence number bits that are considered. The VCN field is an index to the call's egress VCR, and a valid bit that indicates whether the call record is valid or not. When a VCR is unused this bit is cleared. Cells with invalid VCI/VPI's can be detected when accessing their VCRs by checking this bit. The class field indicates the call's traffic class. In an exemplary embodiment, there are 8 traffic classes, though the SSAC differentiates only two priority levels itself.

Word 5 contains multicast information. The single Mcast bit indicates whether the call is multicast or not. The field Mcast link is an index to the next VCR in the chain of a multicast call. In an exemplary embodiment, multicast calls are handled by replicating their cells at the source SSAC, i.e., by generating one cell for each egress SSAC of the multicast call. The fabric inject queue stores cells directed to the switching fabric. As cells are popped from the queue for injection into the fabric, their multicast status is checked. If the cell belongs to a multicast call and has not yet been sent to all its egress ports, then the multicast status call returns the next VCR index in the multicast chain, and the cell is pushed back onto the fabric inject queue along with the VCR index. Otherwise, the cell's buffer is recycled following injection and the cell is not replaced to the queue.

Referring still to FIG. 7, Words 1 and 2 relate primarily to the first of two leaky buckets used for flow control policing, and Words 3 and 4 relate to primarily to the second leaky bucket. The fields for each leaky bucket are identical in use, though initial settings for each will vary depending on the call's service contract. The time field is set by the SSAC with the current time when a policing done on a cell. The X parameter represents the current bucket contents for the call at that time. The L term represents the bucket limit for the call. It is initialized during call setup and remains constant thereafter. The I parameter represents the increment value for flow control and roughly corresponds to the average delay, in cycles, between cells. To determine if a cell violates its call's QoS contract, X is first decremented by the elapsed time and then compared against L. If it exceeds L, the cell is found to be in violation, it may be tagged or discarded. Which action is taken is governed by the fields FC1tag and FC2tag. If the field is set, violating cells will be tagged; otherwise, violating cells will be discarded. Field X is incremented by I if the cell conforms to the service contract.

The CP field indicates whether the call data is packetized. If a cell is discarded for violating its call QoS, the SSAC will set the PDM bit and enter packet discard mode for that call until the next PBI cell is received. Preferably, PBI cells are not discarded, regardless of flow control violations.

The meaning of the various ingress VCR fields is summarized in Table 4.

TABLE 4

| Field | Width (bits) | Bit Position | Description |
| --- | --- | --- | --- |
| Word 0: SCS Header and Miscellany | | | |
| Class | 3b | 47 | traffic class |
| RC | 8b | 43 | SCS routing code |
| Life | 4b | 35 | cell lifetime |
| Iseq | 6b | 31 | current input sequence number |
| Seqlim | 3b | 25 | number of significant bits of sequence number |
| VCN | 14b | 22 | compressed VPI/VCI (currently supports 16,000 calls from a port) |
| Valid | 1b | 0 | Call valid when set |
| Word 1: Flow Control Parameters | | | |
| FC1.time | 20b | 47 | Last Compliance Time of LB #1 |
| FC1.X | 24b | 23 | bucket contents of LB #1 |
| Word 2: Flow Control Parameters | | | |
| FC1.L | 10b | 47 | bucket limit of LB #1 |
| FC1.I | 14b | 27 | increment of LB #1 |
| use FC1 | 1b | 13 | apply LB #1 to cells |
| use FC2 | 1b | 12 | apply LB #2 to cells |
| FC1.tag | 1b | 11 | tag rather than drop cells failing FC1 |
| FC2.tag | 1b | 10 | tag rather than drop cells failing FC2 |

TABLE 4-continued

| Field | Width (bits) | Bit Position | Description |
| --- | --- | --- | --- |
| Word 3: Flow Control Parameters | | | |
| FC2.time | 20b | 47 | Last Compliance Time of LB #2 |
| Valid | 1b | 27 | Call valid when set |
| PDM | 1b | 26 | Call is packet discard mode when set |
| CP | 1b | 25 | Call data packetized when set |
| FC2.X | 24b | 23 | bucket contents of LB #2 |
| Word 4: Flow Control Parameters | | | |
| FC2.L | 20b | 47 | bucket limit of LB #2 |
| FC2.I | 14b | 27 | increment of LB #2 |
| Word 5: Multicast Info | | | |
| Mcast link | 14b | 47 | index to next record in chain of Mcast call |
| Mcast | 1b | 0 | indicates call is multicast |

Referring to FIG. 8, the format of an egress VCR is shown. In an exemplary embodiment, the egress VCR contains three words, Word 0 through Word 2. Word 0 contains the cell's VPI/VCI written to the cell header during cell translation. Word 0 also contains various parameters for the VCOP process including the Class, Ceillim and Cellsin fields. The Class field stores the call's service priority accorded the cell by the SSAC. The Ceillim parameter restrict's the call's cell count on a egress output queue. The Cellsin field provides the current cell count on the output queue.

Words 1 and 2 contain a VC queue descriptor used to control cell resequencing. Prior to describing the meaning of the various fields of Words 1 and 2, the cell resequencing process will first be described.

The cell resequencing algorithm is a vital task for a multipath cell switch. Misordered cells are not acceptable to higher level protocols. The binary hypercube switch fabric, because of its rich multipath nature, along with the potential for delay through retrograding and queuing, may deliver cells out-of-order. Cell resequencing provides the necessary order correction.

Cell resequencing is performed at the egress port using ragged tail queues. It can be done separately for each call in its own VCQ space, or on a multiple call/per ingress port basis using shared queuing resources. Referring to FIG. 9, illustrating a ragged tail queue, cells arrive from the fabric carrying modulo k sequence numbers. At the tail-end of the queue, a m-location resequencing range is defined. A cell is placed within the appropriate location in the resequencing range according to its sequence number. The cells are then placed in the SONET pipe in order.

Whereas in FIG. 9 only two different queue regions are defined, in actual practice, the number of queue regions may be greater than two. Referring to FIG. 10, in an exemplary embodiment, four different queue regions are defined: an output ready region, and output pending region, a forward pending region, and an active input window. The different regions are defined by pointers OH, OT, FT and ITA. As described in greater detail hereinafter, two principal processes involved in cell egress processing are a forward process and a subsequent output process. The pointer FT marks the boundary between cells that have been examined by the forward process and cells that have not. Cells within the output ready region are accounted for on (have been placed to) an egress output queue. Cells within the output pending region have not been placed to an egress output queue due to the call's cell limit restrictions. Cells within the forward pending region are ready for forward processing. Cells within the active input region are being resequenced and are not yet ready for forward processing.

The active input window is defined by ITA and the frame size, derived from the number of sequence bits used for the call. Any slot in the active input window is open for cell placement. Cell placement is determined by the sequence number of the cell relative to the sequence number of the cell at ITA, the front of the active input window. For example, if the cell at ITA has a sequence number of 4 and the current cell sequence number is 8, then the cell is placed 8−4=4 slots over from ITA in the active input window.

A VCQ placement process, described hereinafter, advances ITA when a cell is placed further than half the frame size from ITA, preventing incoming cells from overwriting previous cells. The forward process can also advance ITA as long as it finds full cell slots at the start of the active input window. Because the forward process cannot operate on cells until they are out of the active input window, this measure allows cells that arrive in order to be passed on immediately to the forward and output processes without waiting for half a frame of cells to arrive.

Having described the cell resequencing processing, the meaning of the fields within Word 1 and Word 2 of the egress VCR may be readily understood. Referring again to FIG. 8, in Word 1, the base and length fields define the VCQ. The field FT has been described previously. The field SQbits is the number of significant bits used from the cell sequence number field in resequencing cells. The valid bit indicates a valid call record when set In Word 2, the fields OH, OT and ITA have been described previously. The field PDM represents a packet discard mode (implemented by the VCQ placement process, described hereinafter) that allows cells to be discarded if the VCQ starts to overflow. Once a cell has been discarded, cells of packetized calls will continue to be discarded until the next PBI cell is encountered. The field FPDM is set by the forward process when a missing cell is encountered and likewise causes cells of packetized calls to be discarded until the next PBI cell is encountered. The Outport bit, when set, indicates a call to the local processor. Finally, the CP bit, when set, indicates a packetized call.

The meaning of the various egress VCR fields is summarized in Table 5.

TABLE 5

| Field | Width (bits) | Bit Position | Description |
|---|---|---|---|
| Word 0: ATM Header and Miscellany | | | |
| Class | 3b | 47 | traffic class |
| Celllim | 10b | 43 | Limit on number of cells in egress output queue (set by local processor) |
| Cellsin | 10b | 33 | Number of cells currently in egress output queue |
| VPI/VCI | 24b | 23 | ATM call identifier |
| Word 1: VCQ Descriptor 0 | | | |
| Base | 20b | 47 | base address of queue in flow memory (set by local processor) |
| Length | 12b | 27 | length of queue in flow memory (set by local processor) |
| FT | 12b | 15 | forward process pointer into VCQ-indicates limit for output process in removing cells from VCQ; cells beyond FT are not yet processed |
| SQbits | 3b | 3 | Sequence number significant bits-indicates the range of sequence numbers used for a VC (set by local processor) |
| Valid | 1b | 0 | Indicates a valid call when set |

TABLE 5-continued

| Field | Width (bits) | Bit Position | Description |
|---|---|---|---|
| Word 2: VCQ Descriptor 1 | | | |
| OH | 12b | 47 | Output Head-pointer into VCQ to next cell ready for output |
| OT | 12b | 35 | Output Tail-pointer into VCQ to last cell ready for output |
| ITA | 12b | 23 | Input Tail Address-pointer into trailing edge of input range |
| PDM | 1b | 5 | Input Packet Discard Mode - if set, VCQ placement process currently in discard mode due to VCQ space constraints |
| FPDM | 1b | 4 | Forward Packet Discard Mode-Call in FPDM when set. Set by forward process. |
| Outport | 1b | 1 | output port (1 local processor; 0 SONET) |
| CP | 1b | 0 | Call data packetized when set. Set during call setup. |

Having described the structure of the ingress and egress VCRs, the structure of the various queue entries of queues illustrated in FIG. 6 will now be described.

Referring to FIG. 11, the structure of a VCQ entry is shown. A VCQ entry carries information specific to a particular cell. The cell index indicates the location of the cell payload in cell memory. The CV and OV bits are validity markers applied by the SSAC processes. The CV bit is set if the queue slot is filled by a valid cell. The OV bit is set if the cell is valid for output. The PTI and CLP fields are preserved from the original ATM header and are integrated back into the cell header on output. The latter half of the word is reserved for a VCI to enable future Virtual Path (VP) switching capability. In VP switching, only the VPI is used as a call identifier from the VPI/VCI, and the VCI must be preserved for identifying the call to some downstream VC switch.

The meaning of the various egress VCQ entry fields is summarized in Table 6.

TABLE 6

| Field | Width (bits) | Bit Position | Description |
|---|---|---|---|
| CI | 16b | 47 | Cell Index-Index to cell payload in Cell Memory |
| CV | 1b | 31 | Cell Valid-set if queue slot filled by valid cell |
| OV | 1b | 30 | Output Valid-set if cell valid for output, cleared if not |
| PTI | 3b | 29 | Packet Type Indicator-preserved from ATM header |
| CLP | 1b | 26 | CLP bit-preserved from ATM header |
| Reserved | 24b | 23 | VCI (VP Switching) |

Referring to FIG. 12, the structure of a Forward Queue entry is shown. The forward queue stores VCNs of calls waiting for forward processing. Because multiple cells (e.g., three) can arrive within a cycle, the work that the forward process must do is unbounded, and the forward process may be unable to keep up. Therefore, VCNs are queued until the forward process can attend to that call. In one embodiment, multiple forward processes are provided to handle multiple service classes.

Referring to FIG. 13, the structure of a local processor queue entry is shown. This queue stores cells directed to the local processor. When the queue is non-empty, an interrupt to the local processor is generated. The VCN provides the local processor a call identifier for the cell. The ATM information is passed as is to the local processor. The PTI field in particular may indicate relevant OAM information. The CI field is used to setup the interface address register to facilitate transfer of the cell payload. Traffic to the local processor includes control traffic from a control processor and OAM cells within non-control calls.

The meaning of the various fields of a local processor output queue entry is summarized in Table 7.

TABLE 7

| Field | Width (bits) | Bit Position | Description |
| --- | --- | --- | --- |
| VCN | 14b | 47 | VCR index for cell |
| PTI | 3b | 27 | Payload Type Indicator from ATM cell |
| CLP | 1b | 24 | CLP bit from ATM cell |
| CI | 16b | 15 | Cell Index: pointer to cell payload in Memory |

Referring to FIG. 14, the structure of an egress output queue entry is shown. The VCN field points to the egress VCR of the cell to be output. The VCQ Index field points to the queue slot of the cell to be output. The egress output queues support VCOP which controls access to the SONET pipe. There are separate queues for each traffic class.

Access to an egress output queue is restricted to prevent a burst of cells of one call delaying cells of other calls. Each call is allowed only a limited number of cells on an output queue at any time. It this limit has not yet been reached, as cells become ready for output they are immediately placed to the appropriate output queue by a forward process. Otherwise cells remain in their private VCQ space until they are retrieved by the VCOP process. These limits are supported by the Ceillim and Cellsin fields in the egress VCR.

Referring to FIG. 15, the structure of a fabric inject queue entry is shown. The fabric inject queue stores cells directed to the switching fabric. In the illustrated embodiment, there is one fabric inject queue for calls of all priorities. Entry points to the queue are cells passed through the flow control policing process, or cells directly input from the local processor. The VCN is obtained from a mapping of the VPI/VCI upon cell arrival. The PTI and CLP fields preserve corresponding fields from the ATM header. A cell index CI points to the payload in cell memory.

The meaning of the various fields of a fabric inject queue entry is summarized in Table 8.

TABLE 8

| Field | Width (bits) | Bit Position | Description |
| --- | --- | --- | --- |
| VCN | 14b | 47 | ingress VCR index |
| CLP | 1b | 33 | CLP bit from ATM cell |
| PTI | 3b | 32 | Payload Type Indicator from ATM cell |
| CI | 16b | 15 | Cell Index to cell payload in memory |

Referring now to FIG. 16, operation of the SSAC ingress function will be described. Basic operations on cells in this direction are cell input from SONET (or other broadband source), packet discard, flow control, header translation, multicast, and fabric injection. In an exemplary embodiment, ingress functions are performed by a Utopia input process 1601, a flow control policing (GFCA) process 1603 and a fabric inject process 1605.

The input process gets cells from the physical interface chip through a Utopia interface. As the cell is received, its payload is written to cell memory. Significant header bits are saved for the flow control process.

The flow control policing process first translates the VPI/VCI of a newly-received cell to a VCN so the appropriate call record can be referenced. If the cell belongs to an active call, the current Packet Discard Mode is accessed. If the call is currently in PDM and the current cell is not a Packet Boundary Cell, the cell is discarded. PDM is initiated through either service contract violation or Injection Packet Discard (itself initiated due to output port congestion). Valid cells move onto the policing function. Policing checks that the cell conforms to the calls established service contract. Call setup establishes flow control parameters in the VCR that enforce the call service contract. Conforming cells are written to the fabric injection queue. Nonconforming cells are either discarded or tagged as eligible for discard if congestion arises downstream. On packetized calls, cell discard initiates PDM.

The primary task of the fabric inject process is injecting cells into the fabric. Other tasks include multicast processing and header generation. When activated, the inject process first checks for an injection failure in which the SCS router fails to queue or route the cell. If injection failure has occurred, the cell (with possible exceptions) is retained for injection in the next cycle, and the inject process terminates. On a successful cell injection, a new cell is popped from the inject queue for injection during the next cycle.

As part of injection, a header is generated from information in the VCR. Part of the header includes a sequence number for the cell. After the sequence number has been used, the VCR is updated with the next sequence number.

Multicasting is performed by pushing cells of multicast calls back onto the fabric inject queue for each entry in a multicast egress port list. When the egress port list is exhausted, the multicast cell is discarded following the current injection.

Referring to FIG. 17, operation of the SSAC egress function will be described. Basic operations on cells in this direction are cell delivery from the fabric, cell resequencing, packet discard, output queue placement, ATM header generation and ATM cell output. Cells (or rather cell indices, or tokens) pass from the switch fabric through an fabric delivery process 1701, a VCQ placement process 1703, a forward process 1705, an egress output queue process 1707, and finally through an Utopia output port process 1709 to the SONET chip.

Briefly, the fabric delivery process receives a cell from the SCS router. A single VCQ cell placement process handles cells from all delivery channels and is invoked once per cycle. It resequences delivered cells into their respective VCQs. The forward process places cells to the egress output queues. The egress output queue process controls access to the output port, and the Utopia output port process transmits cells across the Utopia interface when the SONET chip has space for them. Each of these processes will be described in greater detail.

The fabric delivery process controls reception of cells from the SCS router. In an exemplary embodiment, the SSAC and the SCS router are synchronized in their operation, enabling a relatively simple interface. The SSAC receives a single cell over a fabric delivery channel per cell exchange cycle. The SCS router transmits bubble cells if it has no cell to send, which are discarded by the fabric delivery process. When a cell is received, its payload is stored to a pre-allocated buffer in cell memory. Relevant information from the fabric header is registered. Header information and cell validity is passed on to the VCQ placement process.

The VCQ placement process handles any valid cells passed on from the fabric delivery process. The placement process locates the cell's VCR from the VCN contained in the cell header. Cells destined for the local processor are simply pushed on the local processor queue. For other cells, the process must sequence the cell and notify the forward process of the new cell.

To sequence the cell, the VCQ placement process calculates the slot in the VCQ in which to write the VCQ entry, based on the cell sequence number and the current VCR state. In accordance with a method of cell buffer management employed in an exemplary embodiment of the invention, a cell pointer is retrieved from the slot to swap with the input port process for the current cell pointer. The VCQ placement process may update the call state at the same time, depending on whether the input window of the VCQ is to be advanced. Finally, the VCN is pushed on the forward queue. This notifies the forward process of additional work on the call associated with the VCN.

The forward process handles active input window shifting and packet discard, and shares egress output queue cell placement tasks with the egress output queue process. In one embodiment, multiple forward processes are active, one for each call priority level. This ensures cells of well behaved high priority calls are not forced to wait for completion of processing for lower priority (bursty) traffic. This embodiment requires a forward queue for each forward process.

The forward process only operates on cells outside the active input window of the VCQ. The forward process can shift the active input window as long as it encounters filled slots at the start of the active window. It cannot shift the active input window beyond an empty slot. The VCQ process must either eventually fill the slot with a cell or advance the window over the empty slot.

The forward process traverses the queue from where it left off in its last processing of the call, marking cells output valid, performing packet discard and advancing the active window when possible. Packet discard occurs when a cell of a packetized call is dropped. Subsequent cells in the same packet are discarded, up to but not including the next packet termination cell. Dropped cells may occur through cell loss in the fabric (as a result of limited cell lifetime), injection failure and subsequent discard at the source SSAC (in the case of lower priority cells, for example), or out-of-sequence delivery that exceeds the bounds of the resequencing algorithm.

Cell placement to the egress output queue proceeds when the forward process is blocked from further active window shifting due to an empty slot. The forward process is limited in the number of cell tokens it can place by that call's cell limit. The forward process pushes tokens to the selected egress output queue (if possible) until that limit has been met. Then the forward process has finished its work for that call and can proceed to another.

The egress output queue process retrieves the next cell for output and passes it, along with the new cell header, to the Utopia output port process. As it retrieves a cell it attempts to replenish the queue with another cell token for that call. The process is activated once per cycle, and only if the Utopia output port needs a new cell to transmit. The output queue process selects a cell from the highest priority, non-empty output queue.

To retrieve a new cell from the same call, the egress output queue process looks at the call's VCQ. If the call has any output enabled cells that are not yet on the queue, the process will take the first one and push it to the tail of the appropriate output queue. Only one cell is pushed to the queue, as the process assumes that the cell limit is already reached. The process also compresses sequences of invalid cells (due to packet discard) through multiple reads to the VCQ until a valid cell is reached (e.g., up to five reads). If no valid cell is found, a token for the invalid cell is still placed on the queue, to preserve the number of queue entries for the call in question.

The egress output queue process generates the ATM header for a cell from PTI and CLP fields in the VCQ entry and the VPI/VCI in the call record. Other header information (e.g. GFC and HEC fields) are filled in at the SONET chip.

A signal from the SONET chip indicates available buffer space for a complete ATM cell, triggering the Utopia output port process. In an exemplary embodiment, transfer proceeds byte-by-byte on an SSAC-generated clock for 53 clock ticks.

The local processor provides local control over the SSAC through a standard microprocessor peripheral interface. This interface includes address bus, bidirectional data bus, chipselect, interrupt and read/write lines. FIG. 5 illustrates two communication paths with the local processor. The local processor can push cells into the ingress path. It can also receive cells from the egress path. Typically these cells represent commands from a control processor to the local processor, and acknowledgments to these commands. In response to control processor commands, the local processor typically adjusts call state information in SSAC flow memory. The various local processor/SSAC transactions are supported by an local processor/SSAC command protocol. All commands are issued by the local processor, and are executed by the SSAC.

Commands are supported by data, address and command registers. These are some of the SSAC registers directly addressable by the local processor. Other directly addressable registers support SSAC configuration by the local processor. Other than simple direct reads and writes to registers, commands are issued through writes to the command register. Arguments for the command (if any) are pre-placed to the data and address registers. Results of a command (if any) are placed in the data register. The various commands are described in Table 9.

TABLE 9

| Command | Description |
| --- | --- |
| read register | reads data from addressed register to data bus |
| write register | writes data from data bus to addressed register |
| flow memory read | transfers data from flow memory location selected by address register to data register |
| flow memory write | transfers data in data register to flow memory location selected by address register |
| cell memory read | transfers data from cell memory location selected by address register to data register |
| cell memory write | transfers data in data register to cell memory location selected by address register |
| cell header read | loads data register with cell header and loads address register with pointer to cell in memory |
| cell write request | load address register with free cell buffer address |
| cell header write | pushes cell header in data register onto ingress queue |

The more complex transactions between SSAC and local processor—i.e. a cell read or write—are achieved with multiple commands. When the local processor reads a cell from the SSAC, it initiates the transaction with a cell header read request. This prepares the "address" register. It can then process with read cell memory commands until the complete cell is received. Similarly, a cell write is achieved, through a cell write request to prepare the "address" register, multiple cell memory writes, and finally a cell header write command.

Note that multiple sources can send to any particular sink at any time. The question of output port congestion therefore arises. The average output capacity of the cube is 3*N, each of N nodes having three delivery channels each. This is three times the input capacity (just 1*N), and greater than the throughput capacity (2*N). But average case behavior does not protect the switch from localized hotspots. Multiple (e.g., four) sources can be bursting at any particular sink. These sources locally violate the average case behavior, and overwhelm the sink's delivery capacity. Injection Packet Discard (IPD) is a mechanism to protect against this phenomenon.

The idea of IPD is to detect the trouble at the hotspot (the sink port) and notify the sources sending bursty packetized traffic to that sink to enter packet discard mode (in effect, just like PPD) on traffic to that sink.

For purposes of illustration, assume an example hotspot, e.g. a D=4 cube having Node 0000 as the hotspot sink. It's nearest neighbors are nodes 1000, 0100, 0010, and 0001. Five other nodes (say 1111, 1110, 1101, 1011, and 0111) are bursting full-speed at 0000. Several relevant issues arise.

The first issue concerns how a sink recognizes an occurrence of hotspot trouble. In general trouble consists of too many cells in the fabric directed at the sink of node 0000. These cells may be in the switching element at 0000 (with routing codes of 0000, indicating that they should be delivered to that sink). They may be in the nearest neighbors of 0000 with routing codes that indicate that they should be sent to 0000 (i.e., node 1000 has a cell with routing code 1000, and similarly for the other nearest neighbors). They may also be in nodes two hops away, with routing codes directing them to 0000 (i.e., node 1010 has a cell with routing code 1010). In general, when node abcd has a cell with routing code abcd, that cell is destined to node 0000. (Comparable logic applies to sinks other than 0000, but factoring out that node's non-zero address).

Whenever this population of cells directed toward the sink is moving well, congestion is not a concern. More than the average cell flow may be directed toward the sink, but the sink delivery channels (3) can absorb this load. No action is required until such time as a substantial number of cells directed toward the sink are being retrograded. Then a process is begun in which trouble indicators are counted.

In an exemplary embodiment, trouble indicators are not counted all across the cube, for two reasons: the cube is too big, and counting trouble indicators for all N nodes at all N−1 other nodes gives us an O($N^2$) problem; also, traffic to a particular sink does not congest until it gets near that sink. Cells that are further away (e.g., X hops) have many more routing opportunities (X!) than cells that are close. Consequently, it is both safe and effective to look for congestion trouble only very near each sink. In fact, looking at the sink and its nearest neighbors is sufficient. Therefore, in an exemplary embodiment, the output port congestion avoidance process looks for cells in the sink and its nearest neighbors that are destined for the sink, but are being retrograded. In particular, whenever the process (1) observes a cell in 0000 with a routing code of 0000 be retrograded, it counts one trouble indicator, and (2) observes a cell in a nearest neighbor (e.g., 1000) with a routing code which would send it to 0000 (e.g. 1000) be retrograded, it counts another trouble indicator.

Trouble indicators are totalled at each node on each CEC. The local trouble indicators are easy to count, but the process must also count the trouble indicators relevant to this sink at the nearest neighbors. To accomplish this, fields are added to every cell header to carry-trouble indicator counts. Thus, on each CEC, each SCS router informs each neighbor (via the cell sent to that neighbor) of the number of trouble indicators it observed relevant to that sink. This information arrives in the next CEC, but that bit of delay is unimportant. Each node, as a sink, adds these trouble indicators. Normally the sum will be zero. Congested nodes which are unable to deliver their arriving load hotspots will count local trouble indicators. Also, they will retrograde undeliverable cells to their neighbors. These neighbors will have to deal with these retrograded cells, as well as other cells arriving for the sink. Soon these neighbors will have to retrograde cells destined for the sink. They will then report trouble to that sink. In this manner, the sink and its nearest neighbors act in concert to implement a very effective way of finding localized trouble. This same mechanism works at every node in its role as sink.

Having identified what trouble means, and how to quantify it, the further issue arises of how to avoid over-reacting to a brief moment of trouble. Injection Packet Discard (IPD) is a severe protective reaction and could result in the discard of many packets. For this reason, IPD should not be invoked unless it is truly needed. The randomized routing in the cube will lead to occasional brief instances of congestion in the cube. Usually, this congestion dissipates in the next CEC. Brief instances of congestion should not invoke IPD. On the other hand, continued congestion must be avoided and the switch must react quickly to remedy the cause.

A medium is achieved by keeping a sum of the trouble indicators seen by each sink in the last 16 CECs (using a shift register of counts, adding in new trouble counts, shifting, and subtracting out the oldest count). This summing provides an integration of trouble indicators over a brief stretch of time. Only if this sum exceeds a (tunable) threshold is IPD invoked. Appropriate thresholds may be determined empirically and by mathematical modeling, with the threshold being left as a user settable parameter.

In accordance with the description thus far, the sink knows when it is in (time smoothed) trouble. The issue further arises of how to notify all the N−1 sources (actually the N sources, because a sink can be its own source). This is a broadcast problem, where any of N sinks can have to communicate the need for IPD to all N sources.

Referring to FIG. 18, in one exemplary embodiment, central IPD logic 1801 is provided. Each sink has a line to that logic which asserts the need for IPD for cells going to that destination. The central IPD logic has a narrow, inexpensive bus to all switching elements which it uses to broadcast addresses of nodes which have requested IPD. In the case of multiple IPD requests, the central IPD logic queues requests until all are sent out. The bus-based broadcast is very quick. All the nodes listen to the bus for addresses of sinks which have requested IPD. The only problems with this mechanism are: (i) it requires centralized logic, which violates the distributed, fault-tolerant approach followed by the switch, and (ii) it does nothing to rid the cube of cells currently going to the IPD sink.

Referring to FIG. 19, in accordance with an alternate embodiment, a distributed approach is followed. Distributed IPD works like this: A node requesting IPD puts its address in a special field of all outgoing cells. All nodes receiving this signal: (i) delete all bursty cells (ABR/UBR) going to that sink, and (ii) pass the request to all nodes further from the requesting source, and (iii) pass the request to their attached source/sink processing logic. Step (i) clears the cube quickly of the hotspot cells. Step (ii) distributes the request to all nodes. Step (iii) tells the source of cells that an IPD has been requested, and that it should look for appropriate cells to drop.

Now that all sources of cells have been informed of an IPD request for the sink, they look for ABR/UBR cells destined to that sink, and the first one found causes the source to go into PPD (partial packet discard) for that packet, thereby reducing load on the sink. The end-of-frame cell of that discarded packet will be sent, for the benefit of higher level protocols. Normally, the source will do only one packet discard for each IPD request received, but the number of packet discards is preferably a user settable parameter.

A source may have received an IPD request for a particular sink (say, sink 0000) but not observe any relevant traffic (ABR/UBR destined to that address). The source then holds onto the request for some number T of CECs, after which time, it simply discards the request. The parameter T is a user settable parameter, but should be relatively small (e.g., 32 CECs), based on the following reasoning. It would be useless and in fact counterproductive to hold on to IPD requests too long. If no relevant packet is found quickly, then the source wasn't part of the problem, and the danger will already be past.

Physical implementations of the described binary hypercube switch may take various forms. Referring to FIG. 20, in one possible implementation, four functional blocks 2000 each including a SCS router 2001, an SSAC port chip 2003 with associated output buffer 2005 and an associated SONET/optical chip 2007 are placed on a single, small PCB. The SCS routers (and the edge connectors of the PCB) are designed for switches of up to D=6. These PCBs then plug into a (passive) backplane which provides the connectivity required by 16 two-dimensional subcubes. These PCBs can be used for any switch size in increments of four SCS routers (e.g. four OC-3 connections or one OC-12 connection). The output buffers 2005 of the SSACs are conventional, scalable SRAM modules. A local processor 2010 includes a microprocessor 2011, ROM 2013 and RAM 2015.

Referring to FIG. 21, in accordance with an alternative embodiment, a D=7 system is realized using 4-d card (16 SCS routers) plugged into a 3-d backplane.

Many modifications to the switch as described so far will be apparent to one of ordinary skill in the art. For example, the switching elements as described operate in a synchronous manner (assuming a common clock). This is progressively more troublesome as switches get bigger. However, an asynchronous implementation is also possible in which switching elements have their own local clocks, and cells are recognized on the cube edge wires by means of a standard clock recovery header. Such a switch has been modeled.

Furthermore, as described so far, the switching elements are tightly coupled, and optical links go to source/sinks. It should be noted, however, that, optical links may be used between switching elements, thereby producing a distributed switch. The switching element to source/sink links could remain optical, or could be tightly coupled electrical links. In any case, the switch fabric is distributed, which substantially enhances its fault tolerance.

An important potential application of the present switching technology is in communications satellites. There, power consumption, mass, and fault-tolerance are critical. Preliminary engineering estimates indicate that the described switch technology could be used to great advantage in this area.

EXTENSION OF THE INVENTION TO GENERALIZED HYPERCUBES

The binary hypercube is a special case of an interconnection network called the generalized hypercube, described, for example, in Laxmi N. Bhuyan and Dharma P. Agrawal, "Generalized Hypercube and Hyperbus Structures for a Computer Network", IEEE Transactions on Computers, vol c-33, No. 4, April 1984. The generalized hypercube shares many of the properties of the binary hypercube and has practical advantages considering its richer network structure at the cost of increased interconnections between nodes in the network. The methods so far presented are (with minor extension) as applicable to generalized hypercubes as to binary hypercubes.

Generalized hypercubes are defined based on mixed radix addresses. Let a radix set R be defined as $r_i$ for $0 \leq i < D$, an ordered set of integers such that $r_i > 1$. A mixed radix address is a string of digits, $d_{D-1}d_{D-2} \ldots d_1d_0$ such that for all i, $0 \leq d_i < r_i$. The number of possible addresses that can be generated is exactly the product of all the elements of the radix set, and the address set contains the Cartesian product of the elements of the radix set. A generalized hypercube is a graph G={V, E} based on a particular radix set R where V contains one node for every mixed radix address generated by R and there is an edge in E for every pair of addresses that differ in exactly one digit. The D used to define R is the dimensionality of the generalized hypercube.

Generalized hypercubes are identified by their radix sets. For example, the generalized hypercube based on the radix set $\{r_0=2, r_1=3, r_2=4\}$ is called the 4-3-2 generalized hypercube. Binary hypercubes are a special case of generalized hypercubes where every element of the radix set is 2. For example a 3-dimensional binary hypercube is exactly the same as a 2-2-2 generalized hypercube. FIG. 26 shows two example generalized hypercubes: a 3-3 generalized hypercube and a 4-3-2 generalized hypercube. In FIG. 26(a), the edges of the second dimension of the hypercube are drawn as dashed lines. In FIG. 26(b) the edges in the binary dimension (dimension zero) are the vertical arcs; the edges in dimension one with radix 3 are the horizontal arcs; and the edges in dimension two with radix 4 are the straight lines connecting the sets of four nodes.

The number of edges in a generalized hypercube is the sum of the edges in each dimension. The number of edges from a node in a dimension is exactly the radix of that dimension minus one. If all radices in the radix set are the same, then the formula for the number of edges simplifies to $Dr^D(r-1)/2$ where r is the value of the radices. Since $D=\log_D r^D$, for any particular r, the number of edges grows related to the log of the number of nodes, although the growth can be faster than for binary hypercubes since r may be larger than 2. The equation for edges when r is not constant is easily developed, and is still limited by the log factor of the maximum radix in a radix set.

In practical terms, the generalized hypercube can be used to decrease cell latency and jitter in a switch where connecting wires are relatively cheap. For example, in an implementation of a hypercube based switch where 16 switch elements are placed on a PCB and communicate through a backplane to other such cards, the on board connections are far cheaper than the connections through the backplane. Instead of an 8-dimensional binary hypercube with four dimensions on local PCBs and four dimensions across the PCB, a 6-dimensional 2-2-2-2-4-4 generalized hypercube could be implemented. The extensions for the SCS routing algorithm are provided below.

In a node of a binary hypercube there is only one edge per dimension. This fact makes routing relatively simple, since if a cell must travel on that dimension there is only one possible routing. In a generalized hypercube there are $r_i-1$ edges for the $i^{th}$ dimension. If a cell must travel on that dimension, then the correct edge must be selected before the cell will reach its destination. To support routing, every edge in a dimension of a generalized hypercube is assigned a label for each direction a cell will travel; recall that edges are bidirectional.

The label of an edge in the $i^{th}$ dimension of a generalized hypercube is the result of subtracting the $i^{th}$ digit of the source address from the $i^{th}$ digit of the destination address modulo $r_i$. For example, in FIG. 26(a) the label of the edge representing travel from node 02 to node 22 would be labeled 2 (calculated as (2-0) modulo 3). In the reverse direction, representing travel from 22 to 02 the edge would be labeled 1 (calculated as (0-2) modulo 3).

Routing codes are calculated from the source and destination addresses using digit-wise subtraction modulo the radix of the digit. If a node were to be sent from node 02 to node 11 in the 3-3 generalized hypercube of FIG. 26(a), then the routing code would be calculated as (1-0) modulo 3 concatenated to (1-2) modulo 3 or 12. This routing code indicates that the cell can travel from node 02 to node 12 via the edge labeled 1 in dimension 1 and then travel from node 12 by the edge labeled 2 in dimension zero to the destination node 11; or the node can travel from node 02 to node 01 and finally to node 11. Routing codes for generalized hypercubes remain an encoding of all shortest paths just as they are for binary hypercubes.

When a cell travels an edge in a binary hypercube the bit in the routing code corresponding to the edge being traveled is flipped: if the bit is 1, it becomes zero indicating forward progress; if the bit is 0, it becomes 1 indicating retrograde motion. When a cell travels an edge in a generalized hypercube, the routing code is also updated. For a routing code of a cell in a generalized hypercube, when the cell travels an edge, the label of the edge (in the direction of the cell's travel) is subtracted modulo the radix of the dimension from the digit of the routing code corresponding to the dimension of the edge. For example, given the cell at node 02 in FIG. 26(a) with routing code 12, if the cell travels the edge to node 12, then the routing code on arrival is 02, calculated as (1-1) modulo 3 concatenated to 2. Since all edges in a binary hypercube have edges labeled 1, this method of routing code update has the same effect as the bit flipping described above. For radices greater than 2, however, a new possibility is introduced: a non-zero digit of a routing code may stay non-zero.

If the cell at node 02 with routing code 12 traveled to node 00, then the routing code would become 11, calculated as 1 concatenated to (2-1) modulo 3. The shortest path for the cell to reach its destination would remain two hops and the routing code remains an accurate guide for the cell. This new possibility of change of routing code is called lateral motion and is distinct from both forward and retrograde motion. Recall that when a cell is forwarded, the cell is one hop closer to its destination. When a cell is retrograded, the cell is one hop further from its destination. When a cell is lateraled, the cell is neither closer or further from its destination. In this way, the fabric of a generalized hypercube provides an enhanced queuing and load balancing capacity.

The algorithm for edge assignment in a generalized hypercube can now be given:

For each cell priority
   for each cell (considering queued cells first, then cells received last CEC, and finally an injected cell if there is one)
      attempt to deliver the cell if the RC is zero
      else attempt to assign a forward edge
      else attempt to assign a queue position
      *else attempt to assign a lateral edge*
      else attempt to assign a retrograde edge Notice that the algorithm is unchanged but for the addition of the italicized line which introduces an attempt to use a lateral edge. In terms of additional complexity to support generalized hypercubes over binary hypercubes, the primary change is the introduction of modulo arithmetic rather than the XOR operation for calculation and update of routing code.

The difference between implementing a switch based on general hypercubes and a switch based on binary hypercubes is small, and typically restricted to the SCS router portion. The SSE remains unchanged.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A cell switch for switching digital data cells between a multiplicity of input ports and a multiplicity of output ports, comprising a multiplicity of switching elements coupled by bidirectional links to form at least a partial D-dimensional generalized hypercube, such that each of the bidirectional links traverses exactly one dimension of the hypercube, at least some of the switching elements being coupled to at least one of an input port and an output port, each of the switching elements being associated with a controller implementing a regularly-recurring cell exchange cycle during which:

a plurality of digital data cells are sent from at least one switching element to a plurality of adjoining switching elements linked thereto by corresponding ones of the bidirectional links; and a plurality of digital data cells are sent to said at least one switching element from said plurality of switching elements linked thereto by said corresponding ones of the bidirectional links, wherein each digital data cell is exchanged between switching elements only once during a single regularly-recurring cell exchange cycle, the switching element comprising a Source Sink Element (SSE) providing input and output port functions and an SCS router providing cell switching function, wherein there is a multiplicity of paths between any two switching elements, and a switching algorithm of the switch allows a cell to travel any one of the paths between two switching elements, wherein each switching element comprises a plurality of input links, each input link being one of an injection link used to inject cells into the cell switch and a hypercube link used to transport cells within the cell switch, wherein a switching element receives a cell on each of its input links each cell exchange cycle, and wherein each switching element determines a priority ordering of cells which determines the order cells are selected for routing.

2. The cell switch of claim 1, wherein each switching element of the D-dimensional hypercube is given a label consisting of a D-digit address where each digit of the address is limited by the radix of that digit, and each data cell is given a routing code calculated as the difference between destination and the source addresses of the data cell by performing digitwise modulo radix subtraction.

3. The cell switch of claim 2, wherein each link is given a label for each direction determined by the digitwise modulo radix subtraction of digits of originating and terminating addresses corresponding to the dimension of the hypercube the link traverses so that when a data cell is transmitted on a link, the routing code is adjusted by the subtraction modulo radix of the label of the link in the direction the data is transmitted.

4. The cell switch of claim 3, wherein possible moves of a cell by a SCS router in transmitting the cell over a link include a plurality of the following: a forward move in which the data cell is output to a delivery channel of the cell switch or moved closer to its destination, a lateral move in which the data cell remains the same distance from its destination, a queue move in which the data is stored internally within the switching element for at least one cell exchange cycle, and a retrograde move in which the data cell is moved farther away from its destination;
wherein, during the forward move, if all digits of the routing code are zero, then the data cell is output to the deliver channel of the cell switch, and if any digit of the routing code is non-zero, then a non-zero digit of the routing code is set to zero.

5. The cell switch of claim 4, wherein during the retrograde move, a zero digit of the routing code is caused to become non-zero.

6. The cell switch of claim 5, wherein during the lateral move, non-zero digits of the routing code remain non-zero.

7. The cell switch of claim 6, wherein each switching element comprises a number Q of cell queue buffers allowing for a cell to be stored internally within the switching element for more than one cell exchange cycle.

8. The cell switch of claim 7, wherein the queue move results in no change to the routing code.

9. The cell switch of claim 8, wherein each switching element performs a routing algorithm for each cell exchange cycle wherein for each cell input to a switching element, the switching element attempts to assign a forward move; failing which the switching element attempts to assign a queue move; failing which the switching element attempts to assign a lateral move; failing which the switching element attempts to assign a retrograde move; failing which the cell is discarded.

10. The cell switch of claim 7, wherein each SCS router is capable of handling at least D+Q cells at a time without losing a cell.

11. The cell switch of claim 10, wherein at least some of the SCS routers are coupled to both an input port and an output port.

12. The cell switch of claim 11, wherein the SCS router is coupled to both an injection channel and a delivery channel, and at such time as there is a deliverable cell at the SCS router, the SCS router is capable of handling D+Q+1 cells without losing a cell.

13. The cell switch of claim 12, wherein there are D+Q cells in the router, a cell to be injected from the injection channel, and no deliverable cell, then the SCS router and the SSE cooperate to delay injection of a cell for at least one cell exchange cycle.

14. The cell switch of claim 1, wherein every member of the radix set of the generalized hypercube is 2, restricting the switch architecture to a D-dimensional binary hypercube and wherein each switching element of the D-dimensional binary hypercube is given a label consisting of a D-digit binary number, and each data cell is given a routing code calculated as the bitwise XOR of destination and source addresses of the data cell.

15. The cell switch of claim 14, wherein when a data cell is transmitted on a link, a binary bit in the routing code, corresponding to a dimension of the hypercube being traversed, is changed to zero if it is one and to one if it is zero.

16. The cell switch of claim 15, wherein possible moves of the cell by the SCS router in transmitting a cell over a link include a plurality of the following: a forward move in which the data cell is output to a delivery channel of the cell switch or moved closer to its destination, a queue move in which the data is stored internally within the switching element for more than one cell exchange cycle, and a retrograde move in which the data cell is moved farther away from its destination;
wherein, during the forward move, if all digits of the routing code are zero, then the data cell is output to the deliver channel of the cell switch, and if any digit of the routing code is non-zero, then a non-zero digit of the routing code is set to zero.

17. The cell switch of claim 16, wherein during the retrograde move, a zero digit of the routing code is caused to become non-zero.

18. The cell switch of claim 17, wherein each switching element comprises a number Q of cell queue buffers allowing for a cell to be stored internally within the switching element for more than one cell exchange cycle.

19. The cell switch of claim 18, wherein the queue move results in no change to the routing code.

20. The cell switch of claim 19, wherein each switching element performs a routing algorithm for each cell exchange cycle wherein for each cell input to a switching element, the switching element attempts to assign a forward move; failing which the switching element attempts to assign a queue move; failing which the switching element attempts to assign a retrograde move; failing which the cell is discarded.

21. The cell switch of claim 5, wherein each switching element maintains a count of cells destined for that switching element but that are routed along a retrograde path by either the switching element itself or a neighboring switching element, because of output port congestion of the switching element.

22. The cell switch of claim 21, wherein each switching element counts cells destined for the neighboring switching element that the switching element routes along the retrograde path instead of along a forward path to the neighboring switching element and communicates a count of such cells in a header of a subsequent cell routed from the switching element to the neighboring switching element.

23. The cell switch of claim 22, wherein each switching element totals its own count of cells destined for it that it has retrograded and cells destined for it that its neighboring switching elements have retrograded within a given time period and compare the total count to a threshold.

24. The cell switch of claim 23, wherein, if the total count exceeds the threshold, the switching element act to communicate a trouble condition to substantially all other switching elements.

25. The cell switch of claim 24, wherein a switching element, when it receives communication of the trouble condition for a given switching element, performs, for a period of time, at least one of 1) injection packet discard of cells belonging to at least selected packets destined for the given switching element, if any; and 2) discard of buffered cells belonging to at least selected packets destined for the given switching element, if any.

26. The cell switch of claim 25, further comprising centralized injection packet discard logic coupled to substantially all switching elements for communicating the trouble condition for a given switching element to substantially all other switching elements.

27. The cell switch of claim 25, wherein a switching element experiencing the trouble condition acts to cause a broadcast message identifying the switching element as experiencing a trouble condition to be propagated to substantially all switching elements.

28. The cell switch of claim 17, wherein each switching element maintains a count of cells destined for that switching element but that are routed along a retrograde path by either the switching element itself or a neighboring switching element, because of output port congestion of the switching element.

29. The cell switch of claim 28, wherein each switching element counts cells destined for the neighboring switching element that the switching element routes along a retrograde path instead of along a forward path to the neighboring switching element and communicates a count of such cells in a header of a subsequent cell routed from the switching element to the neighboring switching element.

30. The cell switch of claim 29, wherein each switching element totals its own count of cells destined for it that it has retrograded and cells destined for it that its neighboring switching elements have retrograded within a given time period and compare the total count to a threshold.

31. The cell switch of claim 30, wherein, if the total count exceeds the threshold, the switching element act to communicate a trouble condition to substantially all other switching elements.

32. The cell switch of claim 31, wherein a switching element, when it receives communication of a trouble condition for a given switching element, performs, for a period of time, at least one of 1) injection packet discard of cells belonging to at least selected packets destined for the given switching element, if any; and 2) discard of buffered cells belonging to at least selected packets destined for the given switching element, if any.

33. The cell switch of claim 32, further comprising centralized injection packet discard logic coupled to substantially all switching elements for communicating the trouble condition for a given switching element to substantially all other switching elements.

34. The cell switch of claim 33, wherein a switching element experiencing the trouble condition acts to cause a broadcast message identifying the switching element as experiencing a trouble condition to be propagated to substantially all switching elements.

35. The cell switch of claim 17, wherein each SCS router is capable of handling at least D+Q cells at a time without losing a cell.

36. The apparatus of claim 35, wherein at least some of the SCS routers are coupled to both an input port and an output port.

37. The cell switch of claim 36, wherein a SCS router coupled to both an injection channel and a delivery channel, and at such time as there is a deliverable cell at the SCS router, the SCS router is capable of handling D+Q+1 cells without losing a cell.

38. The cell switch of claim 37, wherein there are D+Q cells in the router, the cell to be injected from the injection channel, and no deliverable cell, then the SCS router and the SSE cooperate to delay injection of a cell for at least one cell exchange cycle.

39. A cell switch for switching digital data cells between a multiplicity of input ports and a multiplicity of output ports, comprising a multiplicity of switching elements coupled by bidirectional links to form at least a partial D-dimensional generalized hypercube, such that each of the bidirectional links traverses exactly one dimension of the hypercube, at least some of the switching elements being coupled to at least one of an input port and an output port, each of the switching elements being associated with a controller implementing a regularly-recurring cell exchange cycle during which:

a plurality of digital data cells are sent from at least one switching element to a plurality of adjoining switching elements linked thereto by corresponding ones of the bidirectional links; and a plurality of digital data cells are sent to said at least one switching element from said plurality of switching elements linked thereto by said corresponding ones of the bidirectional links, wherein each digital data cell is exchanged between switching elements only once during a single regularly-recurring cell exchange cycle, wherein at least some of the switching elements comprise an SCS router and an SSE providing a physical-layer interface coupled to a physical channel, the SSE mapping the physical channel to multiple virtual channels.

40. The cell switch of claim 39, wherein the SSE performs per-virtual-channel queuing of cells delivered by the SCS router.

41. The cell switch of claim 40, wherein the SSE comprises an egress output queue and performs weighted round robin selection of cells from a set of per-virtual-channel queues for entry in to the egress output queue.

42. The cell switch of claim 40, wherein the SSE performs cell reordering of cells within each of the per-virtual-channel queues.

43. The cell switch of claim 42, wherein cell reordering is achieved by placing cells in a resequencing window in the per-virtual-channel queue based on cell sequence number.

44. The cell switch of claim 43, wherein the resequencing window is advanced over in ordercells as they are received.

45. The cell switch of claim 44, wherein the resequencing window is advanced over a missing cell due to arrival of a cell such that the difference of the sequence number of the arrived cell and that of the missing cell exceeds a threshold.

46. The cell switch of claim 40, wherein the SSE has multiple physically-separate output queues corresponding, respectively, to multiple different classes of data traffic.

47. The cell switch of claim 46, wherein the SSE performs a weighted round robin selection of cells for output to the multiple output queues.

48. The cell switch of claim 40, wherein the SSE discards selected cells.

49. The cell switch of claim 48, wherein the SSE discards an outbound cell when its per-virtual-channel queue is full.

50. The cell switch of claim 49, wherein all cells belonging to a packet for which a cell has previously been discarded are also discarded except for a Packet Boundary Indicator cell.

51. The cell switch of claim 40, wherein per-virtual-channel queues reside within a single physical memory within the SSE.

52. A cell switch for switching digital data cells between a multiplicity of input ports and a multiplicity of output ports, comprising a multiplicity of switching elements coupled by bidirectional links to form at least a partial D-dimensional generalized hypercube, such that each of the bidirectional links traverses exactly one dimension of the hypercube, at least some of the switching elements being coupled to at least one of an input port and an output port, each of the switching elements being associated with a controller implementing a regularly-recurring cell exchange cycle during which:

- a plurality of digital data cells are sent from at least one switching element to a plurality of adjoining switching elements linked thereto by corresponding ones of the bidirectional links; and
- a plurality of digital data cells are sent to said at least one switching element from said plurality of switching elements linked thereto by said corresponding ones of the bidirectional links,
- wherein each digital data cell is exchanged between switching elements only once during a single regularly-recurring cell exchange cycle, the switching element comprising a Source Sink Element (SSE) providing input and output port functions and an SCS router providing cell switching function,
- wherein there is a multiplicity of paths between any two switching elements, and a switching algorithm of the switch allows a cell to travel any one of the paths between two switching elements,
- wherein each switching element comprises a plurality of input links, each input link being one of an injection link used to inject cells into the cell switch and a hypercube link used to transport cells within the cell switch, wherein a switching element receives a cell on each of its input links each cell exchange cycle, and
- wherein each of the switching elements comprises cell buffers coupled to the input links, a cross-bar switch having a row/column organization coupled to the cell buffers and to the output links or an equivalent set of multiplexers, and cell assignment logic for controlling the cross-bar switch in accordance with row/column assignments that differ from one cell exchange cycle to another.

53. The cell switch of claim 52, wherein the cell assignment logic determines based on an address of its own switching element and an address of a destination switching element for a given cell multiple available paths for the given cell and selects from moves associated with those paths a single move along which to route the given cell.

54. The cell switch of claim 53, wherein each of the SCS routers further comprises row selection logic for determining a priority ordering of cells in the cell buffers and for identifying cells to the cell assignment logic one by one in accordance with the priority ordering.

55. The cell switch of claim 54, wherein the row selection logic determines the priority ordering based on one or more priority bits within a cell header of each cell.

56. The cell switch of claim 55, wherein the row selection logic determines the priority ordering further based on one or more suffer bits within the cell header, a suffer bit serving to indicate that a cell has previously been retrograded, lateraled or queued.

57. The cell switch of claim 54, wherein the row selection logic comprises a priority selection tree.

* * * * *